United States Patent [19]
Sakazaki et al.

[11] Patent Number: 5,923,812
[45] Date of Patent: *Jul. 13, 1999

[54] APPARATUS FOR RECORDING AND REPRODUCING PACKETIZED DATA CONTAINING SELECTIVELY RECORDED IDENTIFICATION DATA

[75] Inventors: Yoshihisa Sakazaki; Shuji Abe, both of Kanagawa-ken, Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/557,792

[22] Filed: Nov. 13, 1995

[30] Foreign Application Priority Data

Nov. 11, 1994 [JP] Japan .................................... 6-278099
Jan. 31, 1995 [JP] Japan .................................... 6-014205

[51] Int. Cl.$^6$ .................................................. H04N 5/783
[52] U.S. Cl. ................................................. 386/68; 386/81
[58] Field of Search ............................... 386/6–8, 40, 68, 386/81, 82, 109, 110, 111, 112, 124; H04N 5/92, 5/91, 5/76

[56] References Cited

U.S. PATENT DOCUMENTS

| | | | |
|---|---|---|---|
| 5,377,051 | 12/1994 | Lane et al. | 386/81 |
| 5,493,456 | 2/1996 | Augenbraun et al. | 386/112 |
| 5,546,244 | 8/1996 | Park et al. | 386/124 |
| 5,550,643 | 8/1996 | Azadegan | 384/124 |
| 5,579,183 | 11/1996 | Van Gestel et al. | 360/48 |
| 5,583,650 | 12/1996 | Lane et al. | |
| 5,623,344 | 4/1997 | Lane et al. | |

FOREIGN PATENT DOCUMENTS

| | | |
|---|---|---|
| 0 606 856 A2 | 7/1994 | European Pat. Off. |
| 0 644 691 A2 | 3/1995 | European Pat. Off. |
| 0 668 697 A2 | 8/1995 | European Pat. Off. |

OTHER PUBLICATIONS

Azadegan et al., "Data–Placement Procedure for Multi–Speed Digital VCR", IEEE Transactions, vol. 40, No. 3, Aug. 1994.

*Primary Examiner*—Thai Tran
*Attorney, Agent, or Firm*—Pillsbury Madison & Sutro LLP

[57] ABSTRACT

A data packet recording apparatus according to a first aspect of the present invention is comprised of: a trick play packet generator for generating trick play data by extracting one or plural types of prescribed date packets from an input data packet train comprising plural types of time-division multiplexed data in a prescribed number or packets based on an identification signal inserted for every packet and outputting a trick play data packet train by packetizing the generated trick play data; an identification table packet inserter for separating and retaining an identification table packet contained in the input data packet train for discriminating the identification signal and outputting the identification table packet into the trick play data packet train several times; and a recording circuit which is capable of recording the output of the identification table packet inserting means in trick play data recording areas at specified track positions.

19 Claims, 16 Drawing Sheets

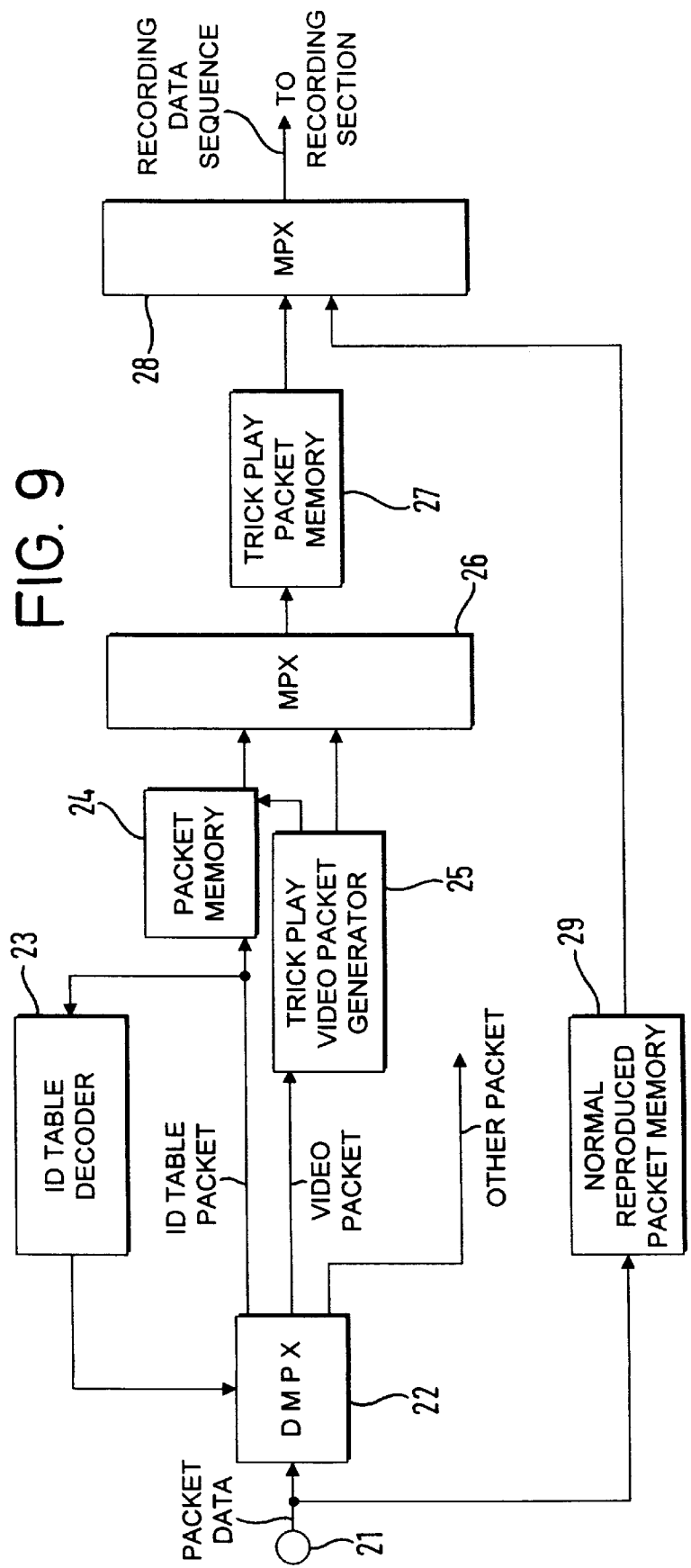

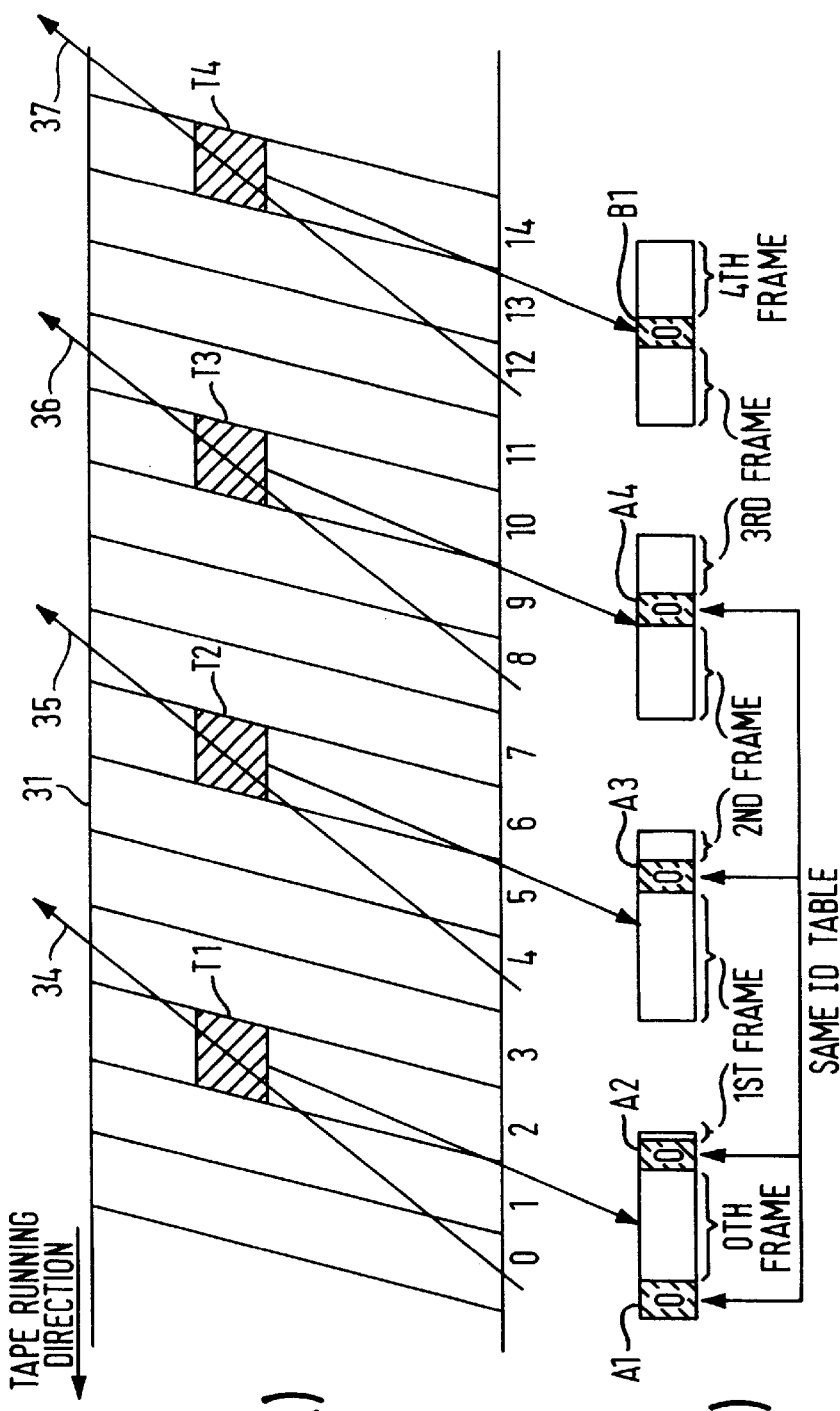
FIG. 10(a)
FIG. 10(b)
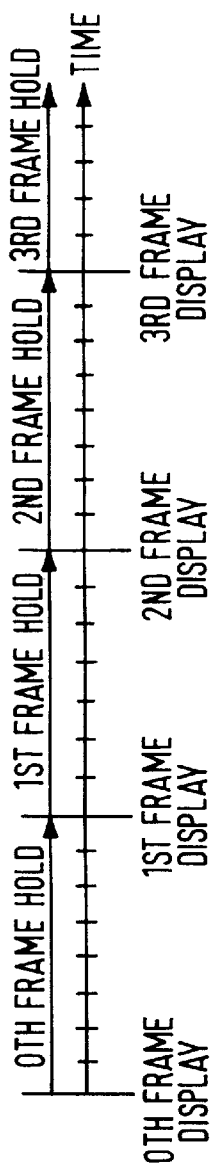
FIG. 10(c)

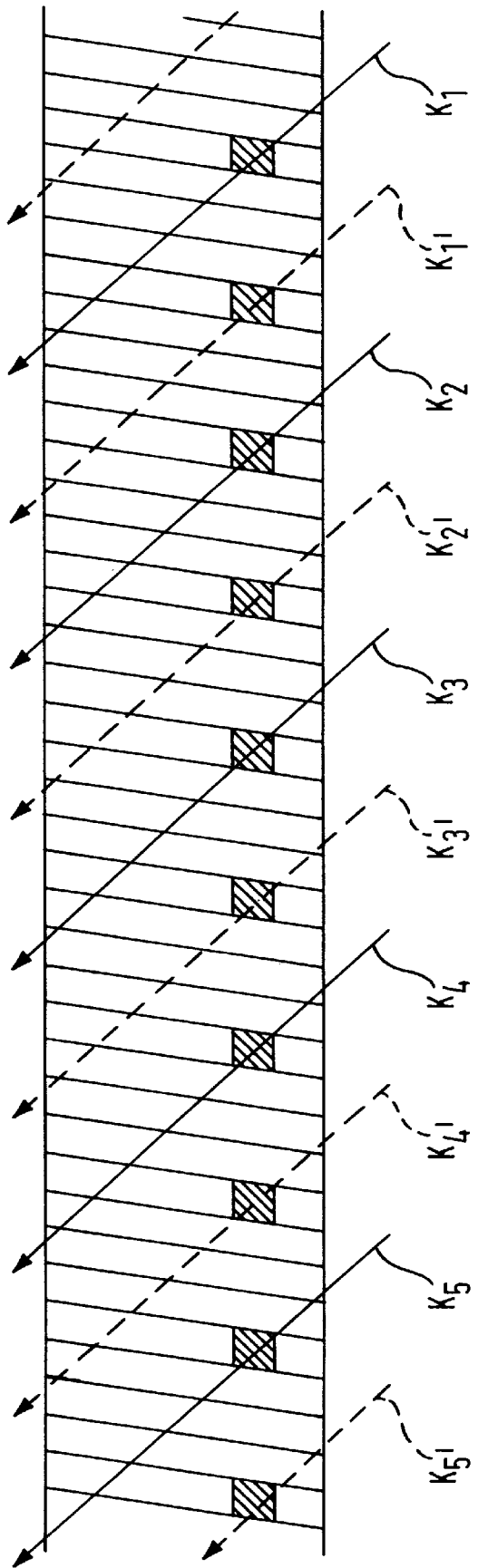

APPARATUS FOR RECORDING AND REPRODUCING PACKETIZED DATA CONTAINING SELECTIVELY RECORDED IDENTIFICATION DATA

BACKGROUND OF THE INVENTION

1. Field of the Invention

The present invention relates to a data packet recording apparatus and a data packet reproducing apparatus suited for recording and reproducing data compressed according to an MPEG standard.

2. Background Information

Digital processing of images has made great progress in recent years as a result of the establishment of image compression techniques such as the MPEG2 (Moving Picture Experts Group 2) standard. Television broadcasting companies have also begun to examine adopting a digital broadcasting system using the MPEG2 standard. In addition, a multiple media service which is capable of providing various information services in response to user demands by handling audio and video data integrally is also being developed at this time. In the MPEG2 standard, video signals are coded using the DCT (Discrete Cosine Transform), inter-frame predictive coding, run-length coding and entropy coding. That is, in the MPEG system, compression (the intra-frame compression) by the DCT in one frame is carried out and inter-frame compression is adopted to reduce redundancy in the time base direction using inter-frame correlation.

The MPEG2 has a system provided for multi-channel broadcasting and multiple communications or storage media. That is, to facilitate time-division multiplexing of plural video and audio data, data are transmitted in packets in the MPEG2 system. Each packet contains the same type of data and an identification signal (PID) identifying the type of data in the packet. Thus, it becomes possible to simultaneously transmit both video and audio data as well as prescribed private data such that the present system is usable in the fields of broadcasting communication and storage media.

FIG. 1 is a diagram showing the construction of a transport data packet which is a unit of data transmission in the MPEG2 standard.

The transport data packets correspond to multi-programs (channels), and a desired program packet is selectable from plural programs which are transmitted according to time-division system during decoding. For purposes of selection, a transport data packet is transmitted with a link level header affixed to a payload to transmit information, as shown in FIG. 2. Out of 188 bytes of the transport data packet, four bytes represent the link level header. Further, the PES (Packetized Elementary Stream Packet) contains several transport data packets.

The link level header is comprised of a sync byte arranged at the top, followed by a transport data packet error indicator showing the presence of bit error, a PES packet start indicator showing the start of the PES packet, a transport data packet priority showing the priority of the transport data packet, a PID (Packet Identification) containing packet identification information, a transport data scrambling control showing the presence of scrambled data, an adaptation field control showing the presence of a payload, etc. and a continuity counter showing the continuity of the same PID arranged in order. Further, a sync byte having eight bits at the top of the packet contains a specific code and is always hexadecimal figure "47".

An MPEG2 decoder extracts packets having the same PID by referring to PIDs of packets which are input successively. Thus, it is possible to decode a desired program from only the transmitted data. For instance, when a transport data stream having video, audio and other data is input, it becomes possible to decode a display video data using only a television set conforming to the MPEG2 standard.

Further, a PID for each packet can be set up as desired at the sending side, but it is necessary to clarify the correspondence of the PID with other information, such as the type of data being identified by the PID. Therefore, in the transport data stream, an identification table describing a PID list, etc. is transmitted in the form of a Program Map Table (PMT) packet. A Program Association Table (PAT) packet identifying the PID of the PMT packet is also transmitted. The PID of the PAT packet is assigned to the 0th position of the transport data stream, as shown in FIG. 2. Further, the PAT and PMT packets are transmitted at prescribed intervals. The transmitted identification table is effective until it is updated by the next identification table packet. The MPEG2 decoder recognizes the relationships between the PID and the type of data being identified by referring to the identification table of the PMT packet.

FIG. 2 is a diagram showing a transport data stream for transmitting plural types of data through the transport data packets (the unit of data transmission in the MPEG2 standard).

In FIG. 2, a transport data stream 1 is comprised of packets based on video data, audio data and other data. Each number in each packet in FIG. 2 indicates a PID, and the PIDs of the PAT and PMT packets are assigned to the 0th and 13th positions, respectively. The transport data stream 1 is transmitted with the PAT packet 2. The 0th PID is arranged at the top of the transport data stream, followed by the PMT packet 3. The PAT packet 2 indicates that the PID of the PMT packet 3 is 13, and the identification table of the PMT packet 3 shows that the PIDs of the video data, the audio data and other data are assigned to the 19th, 20th and 21st positions, respectively. That is, the transport data stream 1 is transmitted with the packets arranged in an order having the PAT and PMT packets 2 and 3 followed by a video packet, an audio packet, two video packets, an other packet, a video packet, and so on as indicated by the PIDs in FIG. 2.

Further, a PAT packet 4, which is transmitted second, indicates that a PID of the PMT packet 5 is assigned to the 13th position and the identification table of the PMT packet 5 indicates that the PIDs of the video packet, the audio packet and other packets are assigned at the 39th, 40th and 41st positions, respectively. Therefore, FIG. 2 shows that the transport data stream 1 is transmitted with the packets arranged in an order having a video packet, another video packet, an audio packet, a video packet, an other packet, a video packet, and so on after the PMT packet 5.

The recording of the transport data stream with a VCR (Video Cassette Recorder) will now be considered. A helical scanning type VCR reads information recorded on a magnetic tape by tracing the recorded tracks formed on the magnetic tape with a rotary head. A normal speed playback is carried out by matching the recorded track pattern with the head trace pattern used at the time of reproduction. This is done by bringing the rotation speed of the rotary head in accordance with the running speed of a magnetic tape at the time of the recording and reproducing.

On the other hand, during trick play operation, the tape running speed is changed according to a desired playback speed. In this case, the head traces the recording tracks by crossing the track pattern instead of matching it, and only data recorded on the portions where the head and the recording track azimuth agree with each other are read. In this case, it is also possible to reproduce one frame in an analog recording where the position on the frame corresponds to the recorded position on a recording medium.

However, when image data compressed according to the MPEG system are recorded on a recording medium, code volumes differ between intra-frame compression frames and inter-frame compression frames, and it is not always possible to reproduce only one frame from the data being reproduced at a fast speed since the vertical position of image data on the frame does not correspond to the vertical recorded position on a recording medium. Furthermore, since it is not possible to decode an independent frame from inter-frame compression frames, playback operation may become impossible if undecoded frames are generated in the fast playback.

Japanese Patent Application TOKUGAN-HEI 06-065298, previously filed by the applicant of the present invention, proposes a method for recording data for fast intermittent playback on the track positions which the head passes during fast playback. At the time of reproduction, images reproduced at a fast speed are obtained by accurately tracing the areas where fast speed playback data are recorded.

FIG. 3 is a diagram illustrating the head trace in the above application. Further, to simplify the explanation, the specification will be described without considering the azimuths of the heads and the recording tracks.

On a magnetic tape 6, recording tracks 7 have been formed. The magnetic tape 6 travels toward the left side during normal playback in FIG. 3. At the time of fast playback, traces 8 of the head extend over plural recording tracks 7. The traces 8, as shown in FIG. 3, are shown at the time of reverse fast playback and are inclined based on the playback speed. When the tracking phase is controlled, trick play data recording areas (the shaded portions in FIG. 3) T (T1, T2, etc.) occur. By tracing the trick play data recording areas T with the head during fast playback operation, the trick play data recorded in the shaded areas can be reproduced.

In the system described above, input coded data are recorded in areas other than the trick play data recording areas T, and trick play data are generated from coded data, packetized into trick play data packets and recorded in the trick play data recording areas T.

FIG. 4 is an explanatory diagram showing a data stream which is recorded in the trick play data recording areas 8. FIG. 4(a) shows an input data stream and FIG. 4(b) shows a trick play data stream. Numerical figures in FIG. 4 indicate PIDs.

The input data stream is assumed to be the same data stream as in FIG. 1. PIDs 19 and 39 shown in FIG. 4(a) indicate video data packets. PIDs 20 and 40 indicate audio data packets and PIDs 21 and 41 indicate other data packets.

Special reproducing data is produced from the video data packets shown by PIDs 19 and 39. For instance, trick play data is produced only from intra-frame compression video data. Further, it is also necessary to record an identification table packet to make decoding of recorded trick play data possible by reproducing and supplying the data to the MPEG2 decoder. For this reason, a 0th PID identification table packet is also recorded as trick play data as shown in FIG. 4(b).

By the way, because the recording rate of trick play data is different than that of normal reproducing data, trick play data and normal reproducing data recorded on the same tracks are separated in time from each other. FIG. 5 is an explanatory diagram showing the correspondence between the recording data and the frames. FIG. 5(a) shows the recording tracks, FIG. 5(b) shows the recorded data in the trick play data recording areas and FIG. 5(c) shows the picture frame display timing during reproduction.

On a magnetic tape 5, trick play data recording areas are provided for recording trick play data of a prescribed speed. Numerical figures shown at the lower end of FIG. 5(a) show record track numbers. In these trick play data recording area, frame data having timings which are different from normal reproducing data are recorded. For instance, as shown in FIG. 5(b), part of the video data from the 0th frame and the first frame are recorded in the trick play data recording area T11 of the 2nd track after the 0th PID data packet. Similarly, part of the video data from the first frame and the second frame are recorded in the trick play data recording area T12 of the 6th track, and part of the video data from the second and the third frames are recorded in the trick play data recording area T13 of the 10th track. Further, in the trick play data recording area T14 of the 14th track, data packets at the 0th PID are recorded following a part of the video data from the third frame, and part of the video data from the fourth frame is recorded after the 0th PID.

By the way, the identification table packets 2 and 3 shown by the shaded portions in FIG. 5(b) may transmit different identification tables. Therefore, it is necessary for the MPEG2 decoder to decode identification tables when decoding video data as described above. Now, it is assumed that the playback mode is changed from normal speed to the trick play mode. In this case, if reproduced data are obtained by the trace 15, the identification table packet 2 in the trick play data recording area T11 is reproduced and therefore, data subsequent to the 0th frame can be decoded. In this case, as shown in FIG. 5(c), the 0th frame image obtained by the decoding process of the 0th frame video data is retained and a displayed until the decoding process of the next first frame video data is completed. Similarly, the image of each frame is stored and displayed until the decoding process of the next frame is completed. Further, the scale of the x axis in FIG. 5(c) shows a display time of one frame.

However, the trick play data recording area T11 is not always reproduced when the reproduction made changes from normal speed to trick play mode. For instance, it is assumed that reproduced data is first obtained by the trace 16 immediately after shifting to the trick play mode. In this case, video data from the first and the second frames are partially reproduced from the trick play data recording area T12. However, the identification table packet 2, which is for discriminating type of these frame data, has not been reproduced in this case. Thus, without the identification table packet 2, it is not possible for the MPEG2 decoder to decode the reproduced data of the trick play data recording area T12. Similarly, the parts of the video data from the second and the third frames obtained by the next trace 17 cannot be decoded either. That is, in this case, only the data reproduced after the decoding of the identification table packet 3 contained in the trick play data recording area T14 can be used for the video display. As shown, FIG. 5(c), in the trick play mode, the signal rate is very low and the same image is retained and displayed during the period of several frames. Therefore, it will become impossible to display an image for a relatively long time immediately after the normal speed playback mode is changed to the trick play mode.

FIG. 6 is an explanatory diagram showing the reproduced data obtained by a series of traces in the trick play mode as shown in FIG. 5(a). NP shown in FIG. 6 indicates the reproduced normal reproducing data and TP indicates the reproduced trick play data.

In the first half of each trace, the reproduced data NP is obtained from the normal reproducing data recording area and the trick play data TP is obtained when the trick play data recording area is traced. The reproduced data train shown in FIG. 6 is thus obtained. The PIDs are not discriminated for the trick play packet and the normal reproduced packet during the recording. Therefore, to extract the trick play data TP from only the reproduced data train shown in FIG. 6 in the trick play mode, it is necessary to record information for discriminating whether given packets are normal reproduced packets or trick play packets.

As described above, there was a problem that trick play images could not be restored immediately after the playback mode was shifted from normal speed to the trick play mode for reproducing trick play data recorded in the trick play data recording areas. Furthermore, there was also a problem with storing information for discriminating whether packets are normal reproducing packets or trick play packets.

FIG. 7 is a diagram showing a data stream which is recorded in the trick play data recording areas T. Numerical figures in FIG. 7 show the trick play data packet numbers, and the recording is made in the order of these numbers.

Since trick play data is a variable length code, the number of packets differ in each trick play frame. FIG. 7 shows an example of trick play data comprising a first trick play frame having 11 packets from the 1st through the 11th packets and a second trick play frame having seven packets from the 12th through 18th packets. By the way, in case of a SD format for a consumer-use digital VTR, every sync block is recorded on tracks as a unit of data recording, which is 90 bytes long. Further, since the packet length of the transport data packet of the MPEG2 is 188 bytes long as shown in FIG. 1, the data is recorded with two packets assigned to five sync blocks.

Now, it is assumed that it is possible to record data by assigning ten sync blocks to one trick play data recording area T. That is, four data packets can be recorded in one trick play data recording area T. When recording, for instance, the 1st through the 4th packets in the trick play data recording area T1 shown in FIG. 3, the 5th through 8th packets, the 9th through the 12th packets, the 13th through the 16th packets and the 17th through the 20th packets can be recorded in the trick play data recording areas T2 through T5, respectively.

In the forward playback operation, the magnetic tape 6 travels toward the left side, the same direction as during the recording, and the head reads the data sequentially toward the right side tracks from the left side tracks as shown in FIG. 3. That is, at the time of fast forward playback operation, the reproduction is made from the trick play data recording area T1 at the left side toward the trick play data recording area T5 at the right side in FIG. 3. If data in the trick play data recording areas T1, T2 and so on can be reproduced during the fast forward playback, data can be reproduced in the order of the 1st, the 2nd, the 3rd, etc. packets, and the 1st and the 2nd trick play frames can be sequentially restored.

However, in the fast reverse playback operation, the magnetic tape 6 travels in the direction shown by the top arrow in FIG. 3, and the reproduction is carried out in the order of the trick play data recording areas T5, T4, T3, etc. That is, the 17th, 18th, 19th and 20th packets are first reproduced from the trick play data recording area T5 and then the 13th, 14th, 15th and 16th packets are reproduced from the trick play data recording area T4. Similarly, data is reproduced from the trick play data recording areas T3, T2 and T1 and consequently the data packets are reproduced in the order of the 9th, 10th, 11th and 12th packets, the 5th, 6th, 7th and 8th packets, and the 1st, 2nd, 3rd and 4th packets.

To restore the trick play frames, it is necessary to arrange each data packet in a frame by frame manner in the original recording order. FIG. 8 is a diagram showing the packet arrangement required for the reverse playback. As shown in FIG. 8, for the reverse playback, reversal of the time sequence of a series of frames is required. Also, the data packets of frames need to be arranged in a coding sequence corresponding to the frame positions. That is, the data packets must be arranged in numerical order for the 12th through the 18th packets and the 1st through the 11th packets.

To rearrange reproduced data as described above, information for identifying a packet at the boundary between the trick play frames is required. Thus, there has been a problem that a flag identifying the boundary between frames must be recorded in packets or sync blocks to make reverse playback possible.

As described above, there was a problem in that recording information indicating a packet at the boundary between frames in packets or sync blocks was required to rearrange the reproduced data packet for restoring trick play frames.

SUMMARY OF THE INVENTION

It is an object of the present invention to provide a data packet recording apparatus which is capable of storing trick play images rapidly, even immediately after the normal speed playback mode is changed to the trick play mode.

Further, it is also an object of the present invention to provide a reproducing apparatus which is capable of restoring trick play images rapidly, even immediately after the normal speed playback mode is changed to the trick play mode.

In addition, it is another object of the present invention to provide a data packet recording apparatus which is capable of reproducing trick play data in the trick play mode with certainty and without recording information for discriminating whether packets are normal speed playback packets or trick play packets.

It is a further object of the present invention to provide a reproducing apparatus which is capable of reproducing trick play data in the trick play mode with certainty without recording information for discriminating whether packets are normal speed playback packets or trick play packets.

In order to achieve the above objects, a data packet recording apparatus according to a first aspect of the present invention is comprised of a trick play packet generator for generating trick play data by extracting one or plural types of prescribed data packets from an input data packet train having plural types of time-division multiplexed data in a prescribed number of packets based on an identification signal inserted for every packet and outputting a trick play data packet train by packetizing the generated trick play data; an identification table packet inserter for separating and retaining an identification table packet contained in the input data packet train for discriminating the identification signal and outputting the identification table packet into the trick play data packet train several times; and a recording circuit which is capable of recording the output of the identification table packet inserting means in trick play data recording areas at specified track positions.

In the first aspect of the present invention, the trick play packet generator generates trick play data by selecting prescribed data packets from an input data packet train and packetizes the generated trick play data to output the data as a trick play data packet train. The identification table packet inserter retains and inserts an identification table packet, which is contained in an input data packet train, into the trick play data packet train several times. The recording circuit records the output of the identification table packet inserter in the trick play data recording area. In the trick play, the trick play data recording area is traced, and the trick play data packet and the identification table packet are reproduced. Since the identification table packet has been inserted several times in the trick play data packet train, the probability that the identification table packet is contained in the reproduced signal immediately after shifting for the normal speed playback mode to the trick play mode is high. For this reason, it is highly probable that a trick play data packet can be restored immediately after the playback mode is shifted from normal speed mode to the trick play mode and it becomes possible to display trick play image from immediately after the mode shifting.

Another object of the first aspect of the present invention is to provide a data packet recording apparatus which is capable of restoring data packets by recording, in packets or sync blocks, a prescribed number of packets assigned with specific packet ID's for a block of a prescribed number of packets without recording information indicating a packet at the boundary between frames in the packets or sync blocks.

Still another object of the first aspect of the present invention is to provide a data packet reproducing apparatus which is capable of reproducing data without recording information indicating a packet at the boundary between frames in packets or sync blocks.

A data packet recording apparatus according to the second aspect of the present invention is comprised of a trick play packet generator for constructing trick play data packets by extracting desired packets from an input data packet train having different types of packets time-division multiplexed in a prescribed number of packets including a packet ID identifying the type of data packet and packetizing the generated trick play data; a specific packet inserter for generating trick play packets by inserting a packet having a specific packet ID into the prescribed number of packets provided for the trick play frames output from the trick play data packet generator to indicate the boundary of the trick play frames corresponding to the trick play data; and a recording circuit for recording the trick play packets in trick play data recording areas at prescribed positions of tracks formed on a magnetic tape.

A data packet reproducing apparatus according to the second aspect of the present invention to play back a magnetic tape recorded by the data packet recording apparatus as described above, is comprised of a specific packet detector for detecting a packet having a specific packet ID from reproduced data obtained by playing back a magnetic tape and a rearranging circuit for rearranging the reproduced data in units of packets based on the detection by the specific packet detector.

In the second aspect of the present invention, the trick play data packet generator generates trick play data from an input data packet train and packetizes the generated trick play data to output the data as a trick play data train. In the output data packet train, a packet having a specific packet ID is inserted into the prescribed number of packets provided for the trick play frames by the specific packet inserter. The packet position corresponding to the boundary between the trick play frames is clarified by the inserted position of a packet having a specific packet ID. The memory media stores the trick play data packets with a packet having a specific packet ID inserted into the trick play data recording area of a magnetic tape.

In the reproducing apparatus according to the second aspect of the present invention, the specific packet detector is supplied with reproduced data and detects a packet having a specific packet ID. The specific packet detector detects a packet corresponding to the boundary between the trick play frames from the detected position. Based on the detection, the rearranging circuit rearranges packets for every trick play frame in the fast reverse playback.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 9 is a block diagram showing a first embodiment of a packet data recording apparatus according to a first aspect of the present invention;

FIGS. 10(a)–10(c) are explanatory diagrams illustrating the operation of the embodiment;

FIG. 18 is a diagram illustrating another embodiment of the second aspect of the present invention.

DESCRIPTION OF THE PREFERRED EMBODIMENTS

Figure 1:
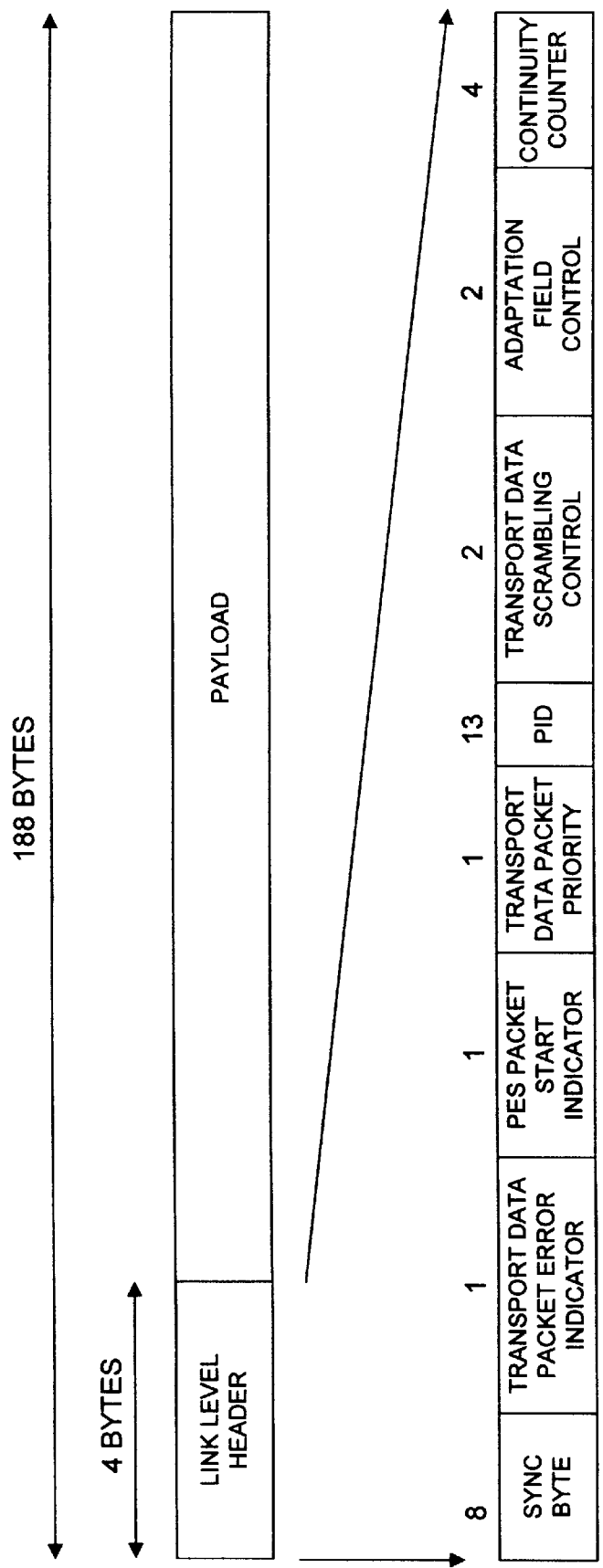
FIG. 1 is a diagram illustrating a transport data packet of the MPEG standard.
Figure 2:
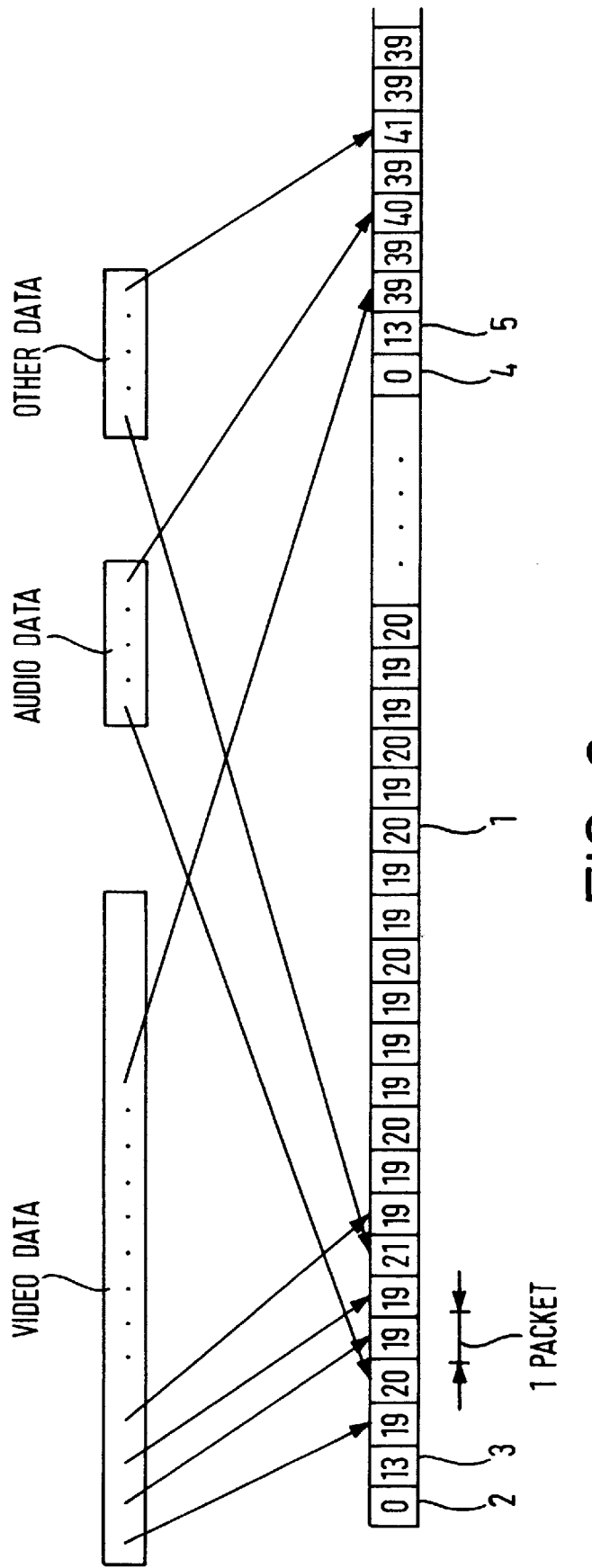
FIG. 2 is a diagram illustrating transmission of data by packets.
Figure 3:
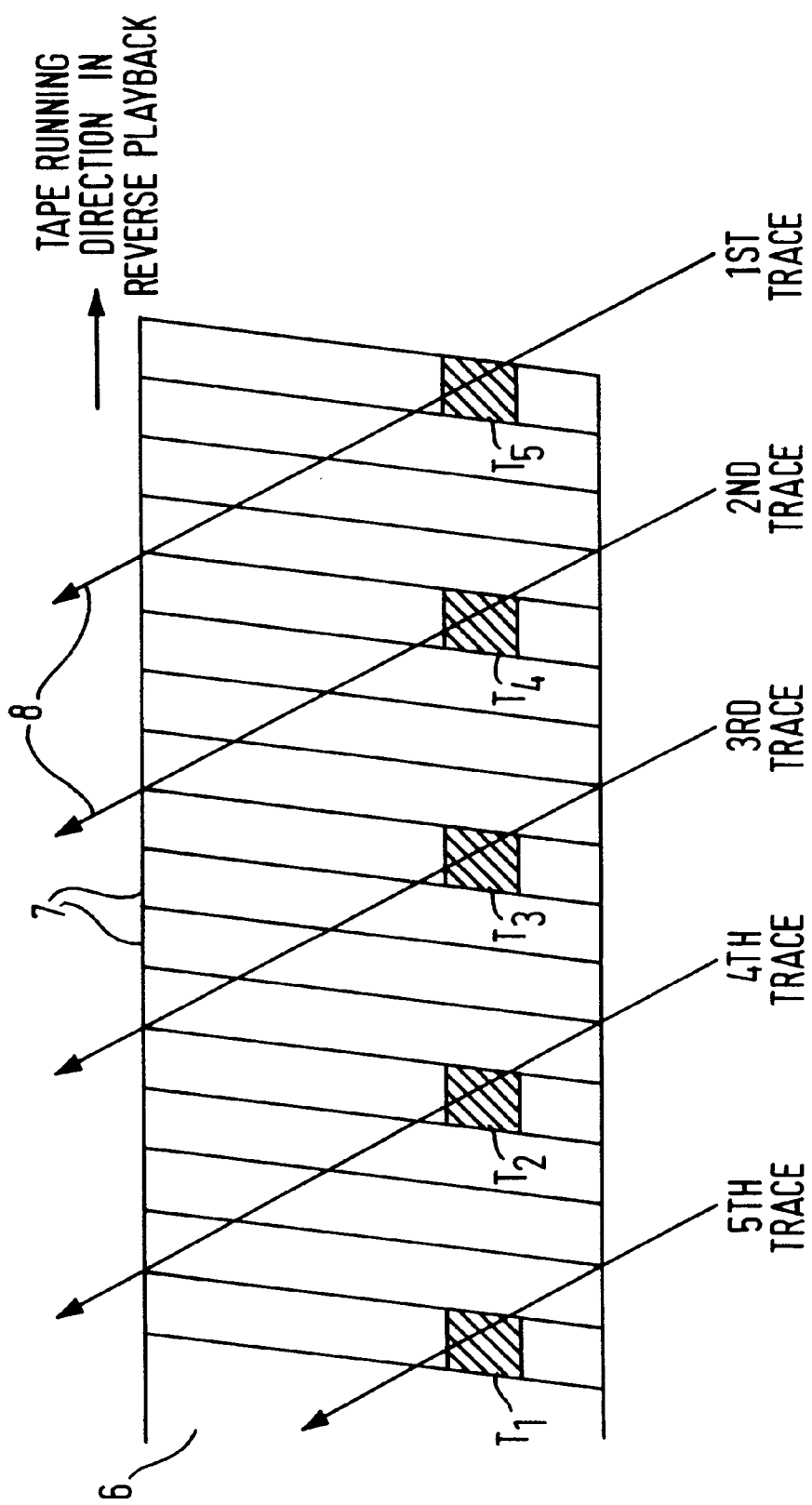
FIG. 3 is a diagram illustrating traces during trick play.
Figure 4A:
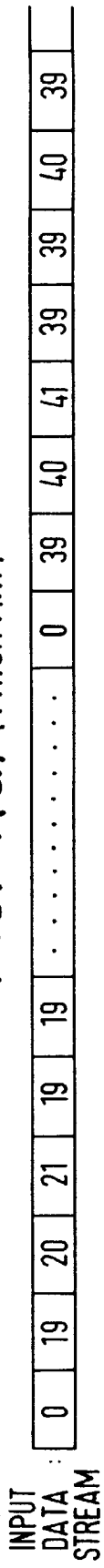
FIGS. 4(a)–4(b) are explanatory diagrams showing a data stream which is recorded in the trick play data recording areas in a prior art system.
Figure 4B:
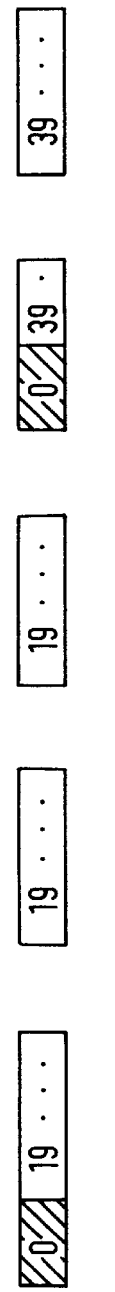
Figure 6:
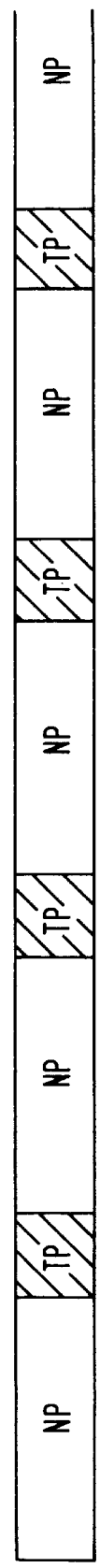
FIG. 6 is an explanatory diagram showing reproduced data in a prior art system.
Figures 5A, 5B, 5C:
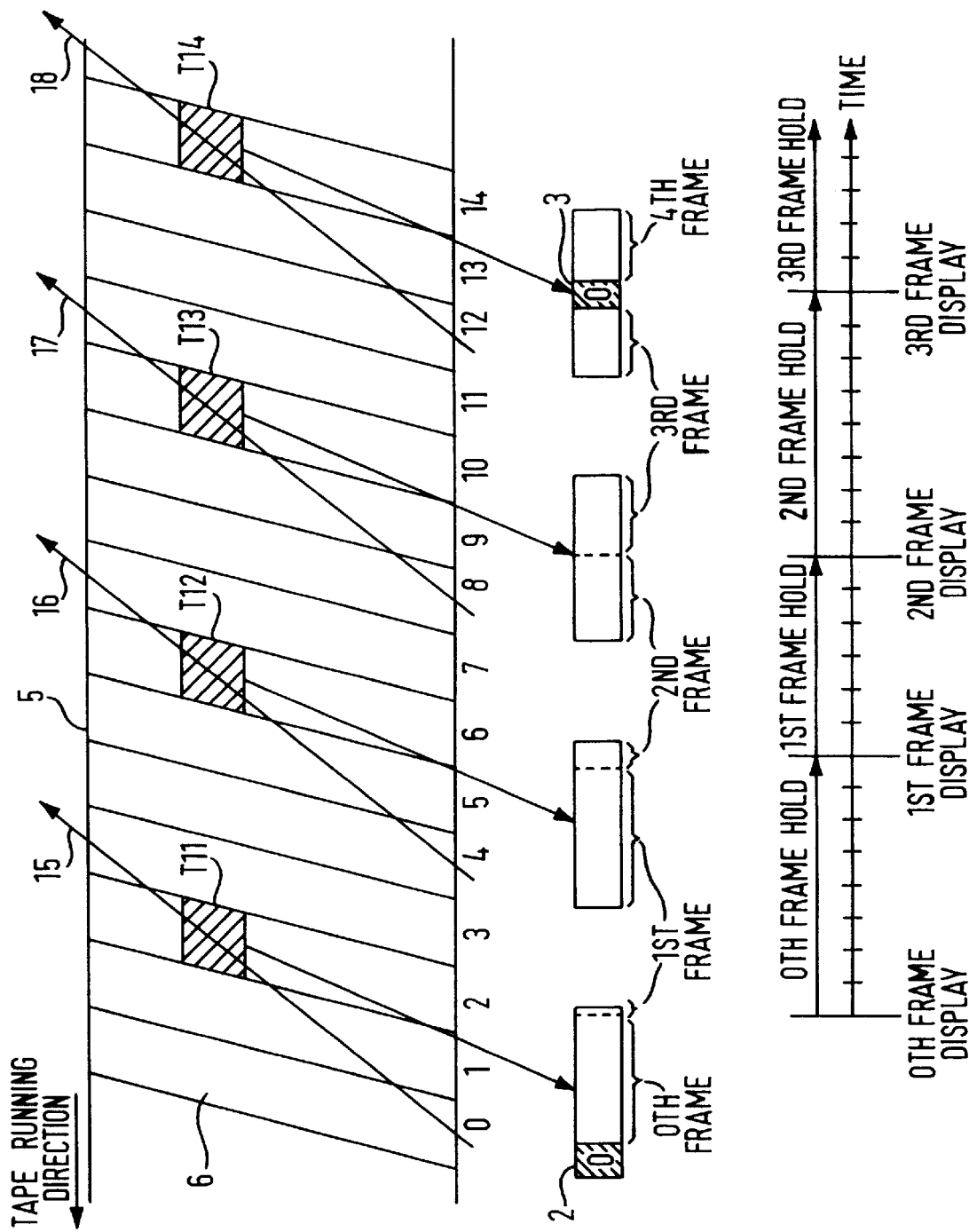
FIGS. 5(a)–5(c) are explanatory diagrams showing the correspondence between recording data and frames in a prior art system.
Figure 7:
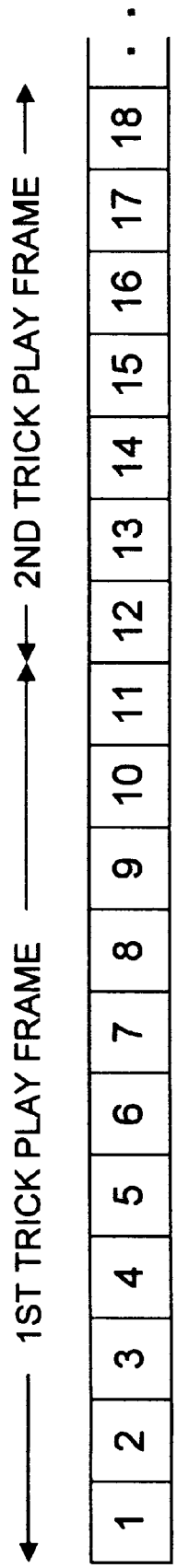
FIG. 7 is a diagram illustrating recording data to be recorded in the trick play data recording areas.
Figure 8:
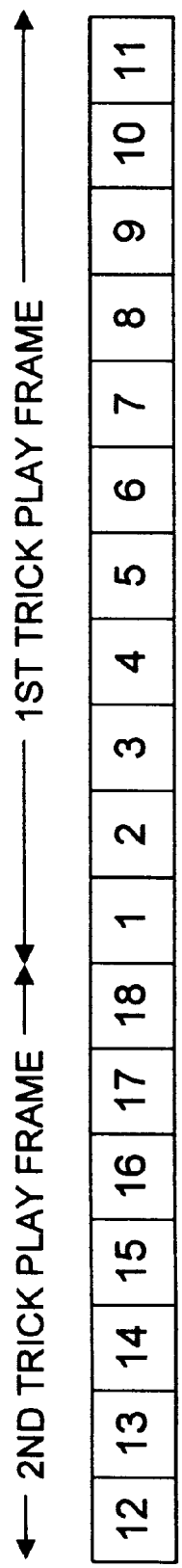
FIG. 8 is a diagram illustrating the reproduced data required in the fast reverse playback.

The present invention will be described in detail with reference to the FIGS. 9 through 18.

FIG. 9 is a block diagram showing a first embodiment of the recording apparatus of the present invention.

Packet data, such as an MPEG2 standard transport data stream, are input to an input terminal 21. In addition to video data packets, other data packets are transmitted. Each data packet is assigned with a PID so that the different types of data packets can be discriminated. In addition, identification table packets showing the relationships between the PIDs and the different types of packet data are that transmitted at prescribed intervals.

Packet data are supplied to a demultiplexer (DMPX) 22. The demultiplexer 22 separates the data packets according to type based on the PIDs contained in the data packet, outputs identification table packets to an identification table decoder 23 and a packet memory 24, and outputs video packets to a trick play video packet generator 25. The identification table decoder 23 decodes and outputs an identification table showing the relationship between the PID and the type of data to the demultiplexer 22. The demultiplexer 22 separates the packets by type based on the identification tables.

The trick play video packet generator 25 generates trick play video data (trick play frame data) from the video data packets, produces trick play video packets by packetizing the generated trick play frame data, and outputs the packets to the multiplexer (MPX) 26. Further, the trick play video packet generator 25 detects the top of the trick play frame in the trick play video packet and outputs a timing signal to the packet memory 24 at the time of detection. The packet memory 24 stores the identification table packet and outputs it to the multiplexer 26 at the time the timing signal is sent. The multiplexer 26 multiplexes an identification table packet and a trick play video packet from the trick play video packet generator 25 and outputs them to a trick play packet memory 27 as a trick play record packet.

The trick play packet memory 27 stores the output of the multiplexer 26 and outputs to a multiplexer 28. In addition, the data packets which are input to the input terminal 21 are also supplied to a normal reproduced packet memory 29. The normal reproduced packet memory 29 stores the input data packets and outputs to the multiplexer (MPX) 28. The multiplexer 28 rearranges the trick play video packets from the trick play packet memory 27 and the normal reproduced packets from the normal reproduced packet memory 29 into the recording data sequence and outputs the packets to a recording section (not shown) as recording data. Further, the recording section adds a prescribed header and an error correction code to the recording data and records all of the data on a magnetic tape (not shown) after a prescribed modulation process. The recording section is also capable of recording the trick play video packets in the trick play data recording areas provided at prescribed positions on a magnetic tape and recording normal reproduced packets in other areas on the tape.

Next, the operation of the embodiment in the construction as described above will be explained referring to FIG. 10. FIG. 10 is an explanatory diagram showing the correspondence of recording data with the frames. FIG. 10(a) shows the recording tracks, FIG. 10(b) shows the recorded data in the trick play data recording area and FIG. 10(c) shows the frame display timing at the time of reproduction. Further, the numerical figures shown at the lower end of FIG. 10(a) show track numbers. The scale of the x axis in FIG. 10(c) indicates the display time of one frame.

The data packet input through the input terminal 21 is supplied to the demultiplexer 22. The demultiplexer 22 detects the PID of the data packet and outputs the data packet with the 0th PID to the identification table decoder 23 as the identification table packet. The identification table decoder 23 generates an identification table by decoding the identification table packets and outputs the identification table to the demultiplexer 22. The demultiplexer 22 separates the sequentially input data packets into identification table packets, video packets and other packets based on the identification table.

The identification table packets are supplied to the packet memory 22 for storage. The video packets are supplied to the trick play video packet generator 25. The trick play video packet generator 25 generates trick play video data (trick play frame data) from the video data packets and produces trick play video packets by packetizing the generated trick play frame data. The trick play video packet generator 25 also detects the top of the trick play frame contained in the trick play video packet and outputs a timing signal to the packet memory 24 at the time of detection. The packet memory 24 outputs the stored identification table packet to the multiplexer 26 according to the timing signal.

The multiplexer 26 multiplexes the trick play video packet and the identification table packet from the packet memory 24 and outputs them to the trick play packet memory 27. Thus, the output of the multiplexer 26 contains the identification table packet in trick play frames. The output of the multiplexer 26 is retained in the trick play packet memory 27.

On the other hand, the data packets input through the input terminal 21 are stored in the normal reproduced packet memory 29 and supplied to the multiplexer 28. The multiplexer 28 outputs the trick play video packets from the trick play packet memory 27 on a magnetic tape during the period corresponding to the trick play data recording area and outputs the normal reproduced packets from the normal reproduced packet memory 29 during the period corresponding to the areas other than the trick play data recording area. The output of the multiplexer 28 is supplied to the recording section (not shown) as recording data and recorded on a magnetic tape with a prescribed header and an error correction code after a prescribed modulation process is applied.

FIG. 10(a) shows the recording tracks of a magnetic tape recorded by the recording section. On a magnetic tape 31, the trick play data recording areas T1, T2, etc. (the shaded areas) have been provided for recording trick play data of a prescribed speed. Data based on the trick play video packets from the trick play packet memory 27, have been recorded in these trick play data recording areas T1, T2 etc. Further, data based on the normal reproduced packets from the normal reproduced packet memory 29 have been recorded in other areas.

FIG. 10(b) shows data recorded in the trick play data recording areas T1, T2, etc. The shaded sections in FIG. 10(b) indicate identification table packets with the 0th PID. As illustrated in FIG. 10(b), in trick play data recording area T1, identification table packet A1 with the 0th PID, the 0th frame data, identification table packet A2 and a part of the first frame data were recorded. In trick play data recording area T2, a part of the first frame data, identification table packet A3, and a part of the second frame data were recorded. In trick play data recording area T3, a part of the second frame data, identification table packet A4 with the 0th PID, and a part of the third frame data were recorded. In trick play data recording area T4, a part of the third frame data, identification table packet B1 with the 0th PID, and the fourth frame data were recorded.

As described above, the identification table packet is inserted into the trick play video packets at the top of each frame data by the packet memory 24. In other words, the preceding identification table packet is repeatedly recorded for every frame until the next identification table packet is transmitted. For instance, identification table packets A1 through A4 are based on the same identification table packet, and the same identification table is transmitted until identification table packet B1 transmits an identification table which is different from identification table A1.

Now, it is assumed that the playback mode is changed from the normal speed mode to the trick play mode. In this case, the first effective trace after the mode change is assumed to be trace 35 to reproduce data from trick play data recording area T2. Then, a part of the first frame data, identification table packet A3 and the top data of the second frame in the trick play data recording area T2 are first reproduced by trace 35. Of these reproduced data, the first frame data is not used for decoding because its top portion has not been reproduced. However, the top data of the second frame can be identified as being a trick play video packet because identification table packet A3 has been decoded. Thereafter, the reproduced data obtained by traces 36 and 37 can be decoded using the decoding data of identification table packets A3, A4, etc. Similarly, when the first effective trace after switching from the normal speed playback mode to the trick play mode is, for instance, trace 36, data which are reproduced after identification table packet A4 can be decoded.

FIG. 10(c) shows a timing chart for displaying a restored image when the first effective trace after changing from the normal speed playback mode to the trick play mode is trace 34. In this case, reproduced data subsequent to the 0th frame is decoded since identification table packet A1 has been reproduced, as illustrated in FIG. 10(c). The decoded video data of the 0th frame are retained and displayed repeatedly until the decoding process of the first frame is completed. Similarly, the decoded data of each frame is retained and displayed repeatedly until the decoding process of the next frame is completed.

In this embodiment, since a trick play video packet to be recorded in the trick play data recording area is generated with an identification table packet inserted repeatedly for every trick play frame, the identification table packet can be reproduced whenever the top portion of a frame is reproduced, regardless of when the trace in the trick play mode is started. Therefore, it is possible to restore and display a trick play image immediately after the playback mode is shifted from the normal speed mode to the trick play mode.

Further, although the identification table packet is output for every trick play frame from the packet memory and inserted into the trick play video packet in this embodiment, the identification table packet can be inserted at any other cycle as well.

Figure 11:
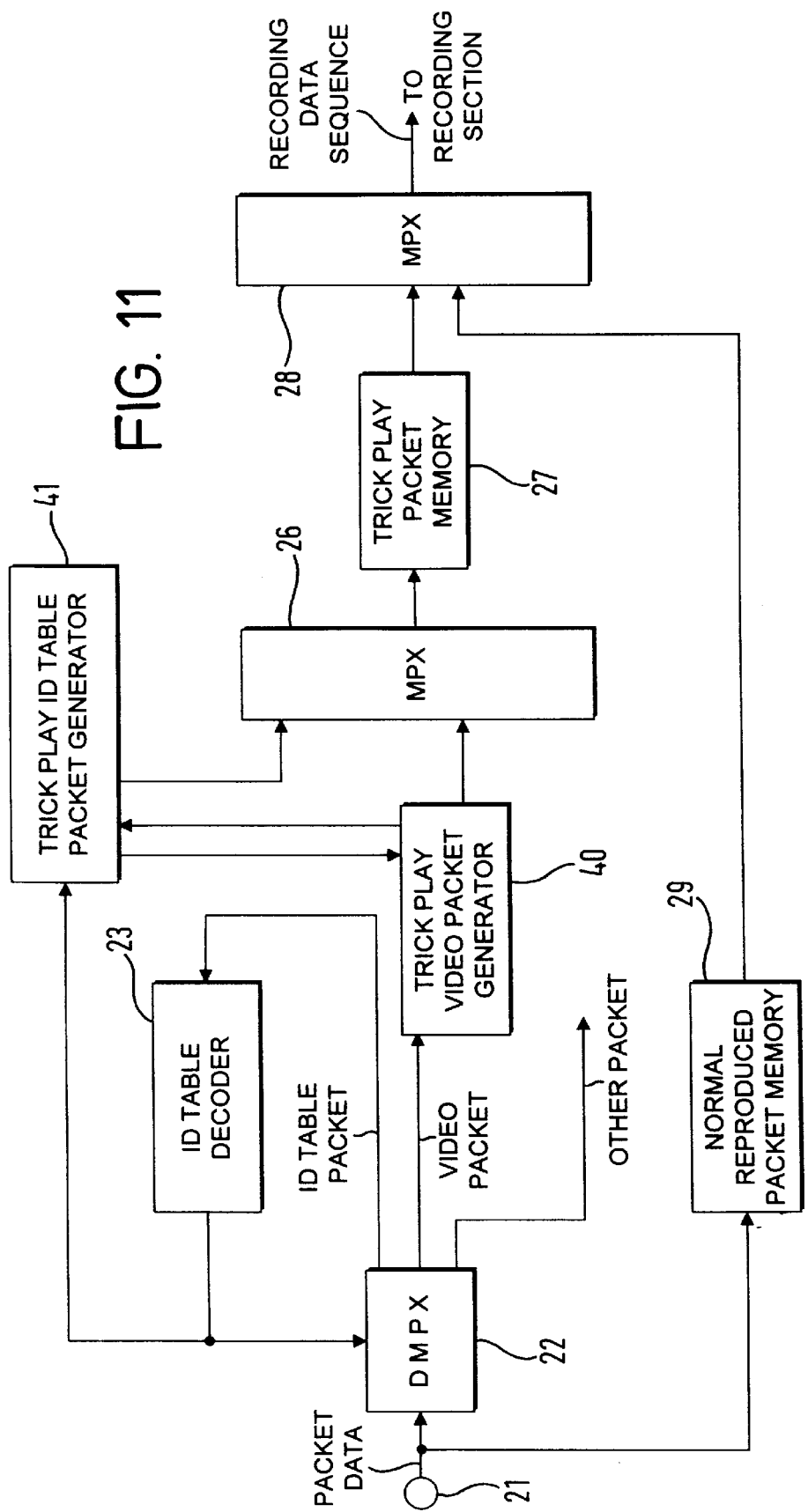
FIG. 11 is a block diagram showing a second embodiment according to the first aspect of the present invention.

FIG. 11 is a block diagram showing a second embodiment of the present invention. In FIG. 11, reference numerals used in FIG. 9 will be used to designate the same elements and the explanations of these elements will be omitted.

This embodiment differs from the first embodiment shown in FIG. 9 in that the packet memory 24 was deleted, a trick play video packet generator 40 has been substituted for the trick play video packet generator 25, and a trick play identification table packet generator 41 has been provided. The identification table decoder 23 outputs an identification table to the demultiplexer 22 and to the trick play identification table packet generator 41. The trick play identification table packet generator 41 sets up PIDs which are different from the PIDs used for the normal reproduced packets by changing the identification table and outputs the new PIDs as trick play PIDs to the trick play video packet generator 40. Further, the trick play identification table packet generator 41 outputs the changed identification table packet to the multiplexer 26 as trick play identification table packets.

The trick play video packet generator 40 generates trick play frame data from video data packets and produces trick play video packets by packetizing the generated trick play frame data. In this case, the trick play video packet generator 40 uses a trick play PID from the trick play identification table packet generator 41 as a PID in the trick play video packets. The trick play video packets are supplied to the multiplexer 26. The multiplexer 26 multiplexes the identification table packet from the trick play identification table packet generator 41 and the trick play video packet from the trick play video packet generator 40 and outputs them to the trick play packet memory 27 as a trick play recording packet. For instance, the multiplexer 26 outputs the identification table packet in the trick play frames contained in the trick play video packet.

In the embodiment in the construction as described above, the identification table decoded by the identification table decoder 23 is supplied to the demultiplexer 22 and to the trick play identification table packet generator 41. The trick play identification table packet generator 41 sets up a PID for the trick play video packet which is different from the PID for the normal reproduced packet. The new PID output is output as the PID for trick play to the trick play video packet generator 40. Thus, the PID for the trick play video packet generated by the trick play video packet generator 40 differs from the PID for the normal reproduced packet from the normal reproduced packet memory 29. The multiplexer 26 outputs the identification table packet with the changed PID by inserting it into the trick play video packet in the trick play frames. Other operations are similar to the embodiment shown in FIG. 9.

Since the PID for the trick play video packets, which are recorded in the trick play data recording areas, differs from the PID for the normal reproduced packets which are recorded in other areas, it is possible to extract only the trick play video packets from reproduced data by identifying the PID at the decoder side. It is therefore not necessary to record separate information for discriminating whether packets are normal reproduced packets or trick play packets when recording them.

Figure 12:
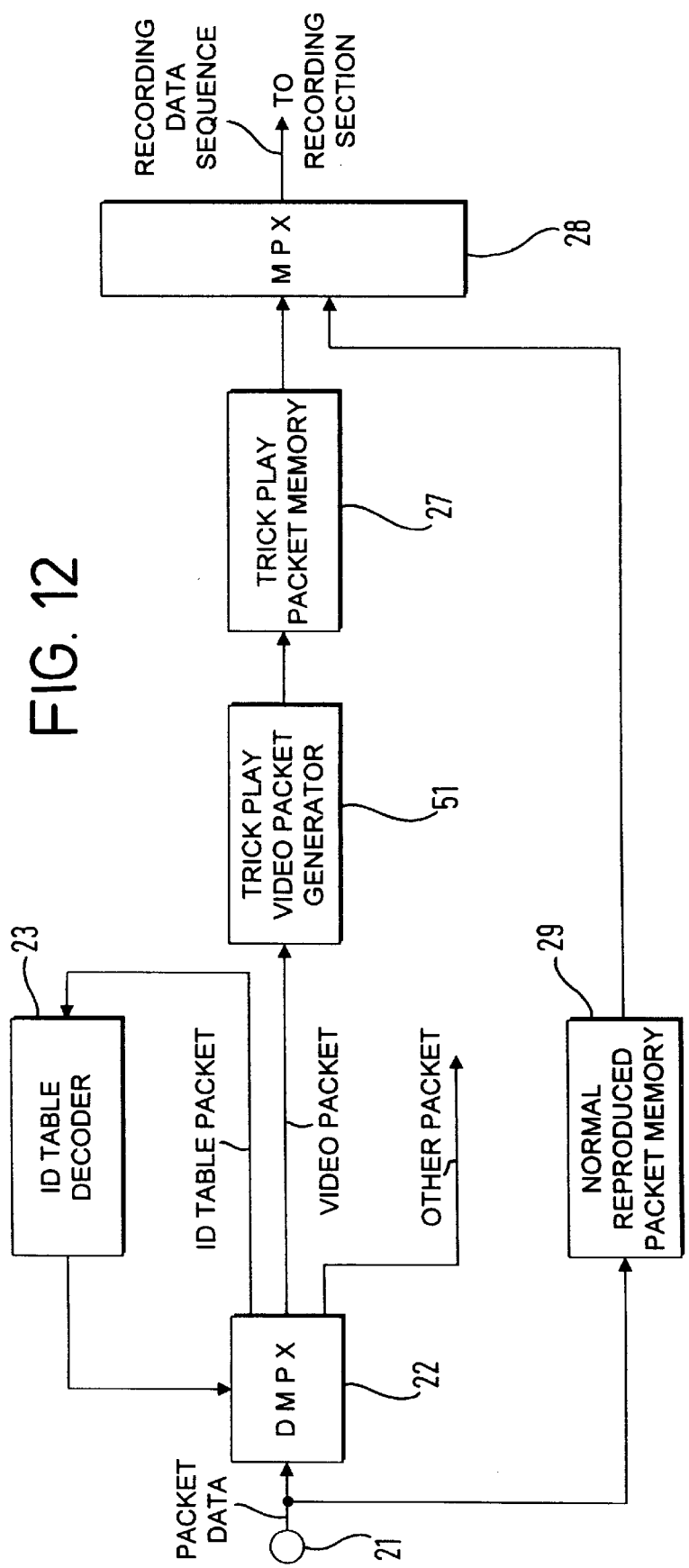
FIG. 12 is a block diagram showing a third embodiment according to the first aspect of the present invention.

FIG. 12 is a block diagram showing a third embodiment of the present invention. In FIG. 12, the reference numerals used in FIG. 9 will be assigned to the same component elements and their explanation will be omitted.

This embodiment differs from the embodiment shown in FIG. 9 in that the packet memory 24 was deleted and a trick play video packet generator 51 has been adopted for the trick play video packet generator 25.

The trick play video data packet generator 51 generates trick play frame data from the video data packets and produces trick play video packets by packetizing the generated trick play frame data. In this case, the trick play video packet generator 51 changes the PID for each trick play packet to the PID for trick play of a prescribed code which is not used for the normal reproduced packets from the normal reproduced packet memory 29. This trick play video packet is output to the trick play packet memory 27. In other words, in this embodiment, the identification table packets are not recorded in the trick play data recording areas on the magnetic tape. Instead, only trick play video packets from the trick play video packet generator 51 are recorded.

Figure 13:
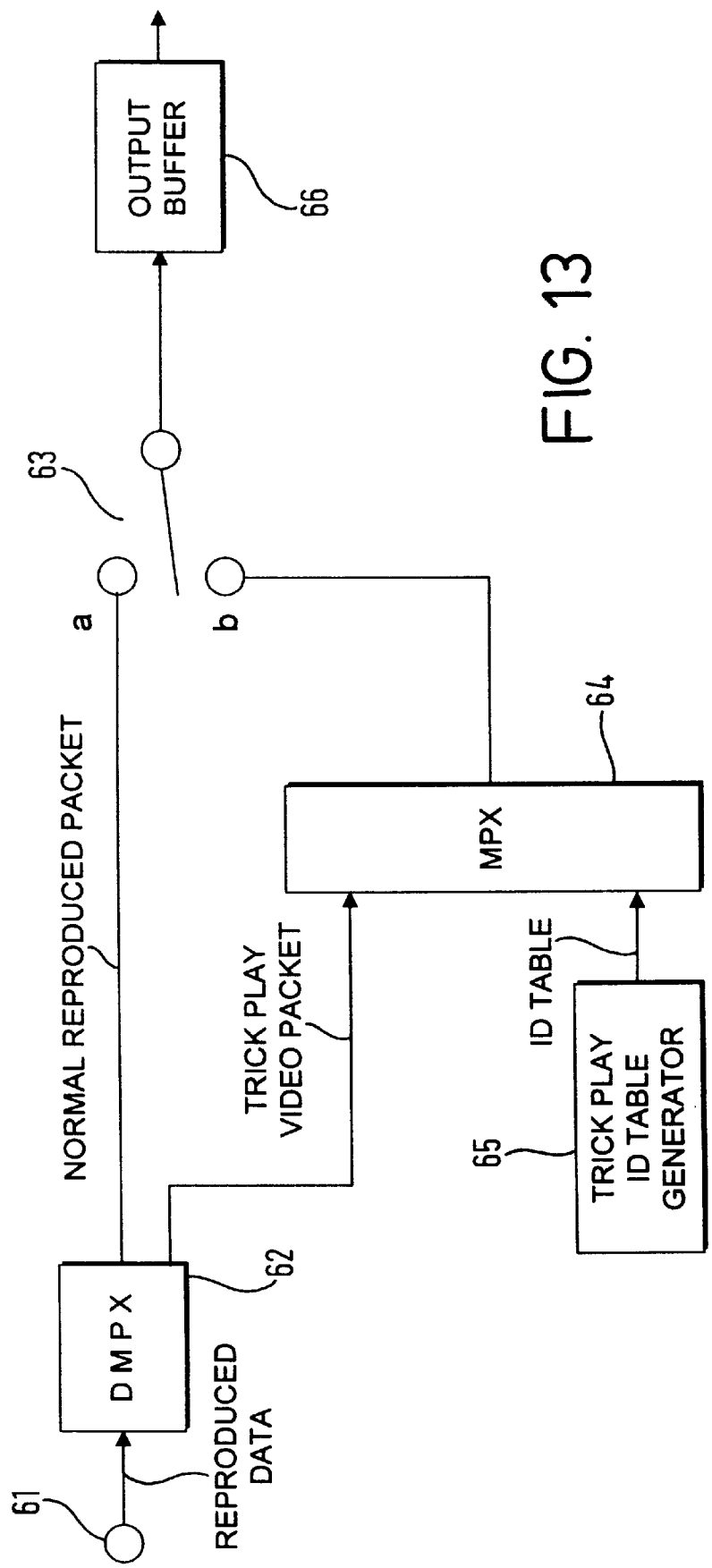
FIG. 13 is a block diagram showing one embodiment of a packet data reproducing apparatus for playing back a magnetic tape recorded by the packet data recording apparatus shown in FIG. 12.

FIG. 13 is a block diagram showing one embodiment of a reproducing apparatus for playing back a magnetic tape recorded by the recording apparatus shown in FIG. 12.

Reproduced data, obtained by applying the demodulation process and the error correction process to reproduced signals obtained by tracing a magnetic tape (not shown), is supplied to an input terminal 61. This reproduced data is applied to a demultiplexer (DMPX) 62. The demultiplexer 62 detects the PIDs of packets contained in the reproduced data and separates normal reproduced packets from the trick play video packets based on the detected PIDs. That is, the multiplexer 62 separates the packets for normal speed playback and the video packets for trick play according to whether the PIDs are used for the normal reproduced packets or for the trick play packets. The demultiplexer 62 supplies the normal reproduced packets to terminal a of switch 63 and the trick play video packets to a multiplexer (MPX) 64. The multiplexer 64 is also supplied with the output of a trick play identification table generator 65.

The trick play identification table generator 65 generates an identification table responding to the PID for trick play and outputs the identification table to the multiplexer 64. The multiplexer 64 inserts the identification table packet in the trick play video packet and outputs it to terminal b of switch 63. The multiplexer 64 may insert the identification table packet immediately after the playback mode has been shifted from the normal speed mode to the trick play mode or at some other prescribed timing.

The switch 63 selects terminal a in the normal speed playback mode and terminal b in the trick play mode, and outputs the input data packet to an output buffer 66. The output buffer 66 outputs the input data packet to a decoder (not shown) at a selected reproduction rate.

In the recording apparatus shown in FIG. 12 in the construction as described above, trick play video packets are generated by a trick play video packet generator 51. In this case, the PID for the trick play video packet is changed to a new trick play PID which is not used for normal reproduced packets. The trick play video packet is supplied to the multiplexer 28 via the trick play packet memory 27. That is, the output of the trick play packet memory 27 contains no identification table packet. The multiplexer 28 outputs the trick play video packet from the trick play packet memory 27 during the period corresponding to the trick play data recording area of a magnetic tape and the normal reproduced packet from the normal reproduced packet memory 29 during the period corresponding to areas other than the trick play data recording area.

On the other hand, in the reproducing apparatus shown in FIG. 13, reproduced data is supplied to the demultiplexer 62. Using the fact that the PID code used for normal reproduced packets differs from the PID used for trick play video packets, the demultiplexer 62 separates the normal reproduced packets from the trick play video packets. The trick play identification table generator 65 generates an identification table responding to the PID for trick play and outputs the table to the multiplexer 64. The multiplexer 64 inserts the identification table into the trick play video packet and outputs to the switch 63.

The switch 63 selects terminal b in the trick play mode. Thus, the output of the multiplexer 64 is output at a selected reproduction rate via the output buffer 66. The identification table has been inserted into the trick play video packet from the multiplexer 64, for instance, immediately after the shifting to the trick play mode. Therefore, it is possible to decode video data of the trick play video packet by decoding the identification table with the decoder (not shown).

As described above, in the embodiments shown in FIGS. 12 and 13, the PIDs used for the trick play video packets are set at a prescribed code which is not used for the normal reproduced packet. Only trick play video packets are recorded in the trick play data recording areas of a magnetic tape without recording the identification table packet and thus, it is possible to improve the recording rate. Further, it is possible to decode trick play video packets in the trick play mode by generating and inserting the identification table packet corresponding to the trick play PID into the trick play video packet at the reproduction side. Trick play images can be restored and displayed with certainty even immediately after shifting from the normal speed playback mode to the trick play mode.

Further, in the embodiments described above, trick play images have been explained as frame data, but they may be field data or data in prescribed areas on a screen.

As described above, the first aspect of the present invention can restore trick play images with certainty even immediately after the playback mode is shifted from the normal speed mode to the trick play mode. In addition, the invention can reproduce trick play data in the trick play mode accurately without the recording of information for discriminating whether packets are for normal speed playback or for trick play.

Figure 14:
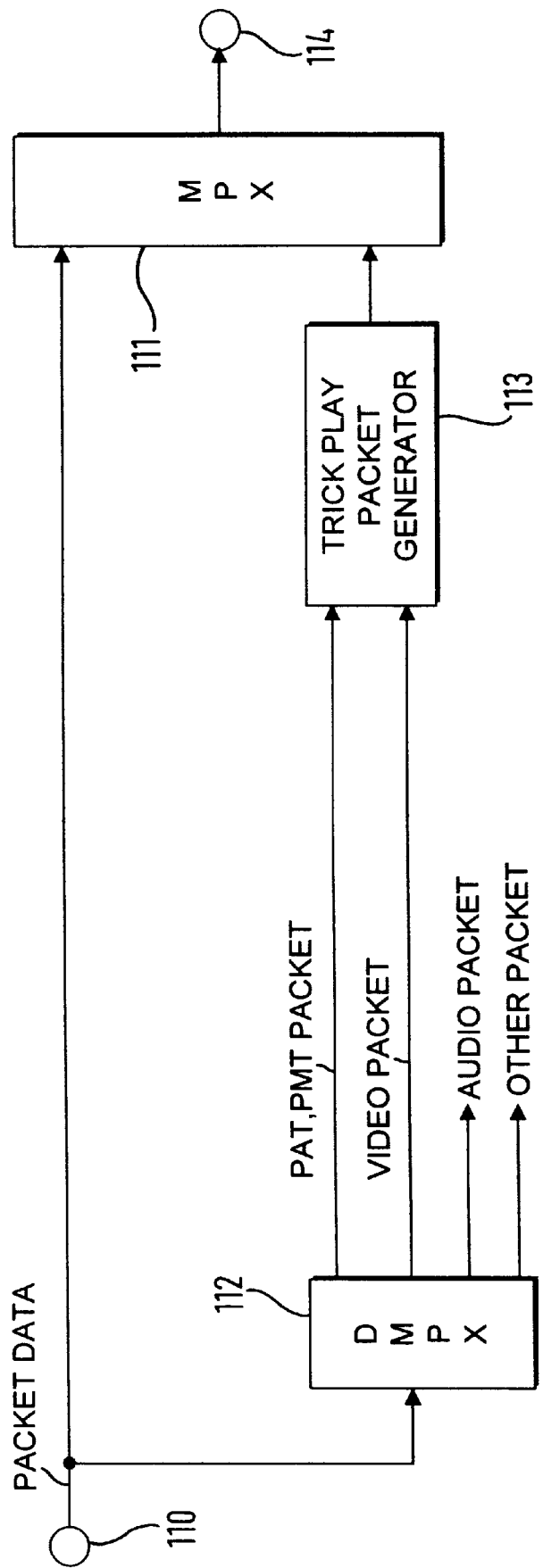
FIG. 14 is a block diagram showing an embodiment of a data packet recording apparatus according to the second aspect of the present invention.

Hereinafter, preferred embodiments according to the second aspect of the present invention will be described with reference to the attached drawings. FIG. 14 is a block diagram showing a first embodiment of a data packet recording apparatus according to the second aspect of the present invention.

Packet data such as a transport data stream of the MPEG2 standard, etc., are input to an input terminal 110. In addition to video and audio data packets, other data packets are also transmitted. Each data packet is assigned with a PID so that the type, etc., of data packet can be discriminated. In addition, an identification table showing the relationship between the PIDs and the data packet types is transmitted by the PMT packet, and information indicating the PID of the PMT packet is transmitted by the PAT packet.

The input data packets are supplied to a multiplexer (hereinafter referred to as MPX) 111 and also, to a demultiplexer (hereinafter referred to as DMPX) 112. The DMPX 112 detects a PID contained in the data packet and decodes a PAT packet and a PMT packet having a specific PID. The DMPX 112 separates the data packets into its various types based on the PIDs and the decoding results of the packets and outputs the PAT, PMT and video packets to a trick play packet generator 113. The trick play packet generator 113 generates trick play packets based on the input data packet. Further, the embodiment shows an example using only video packets for generating trick play data.

Figure 15:
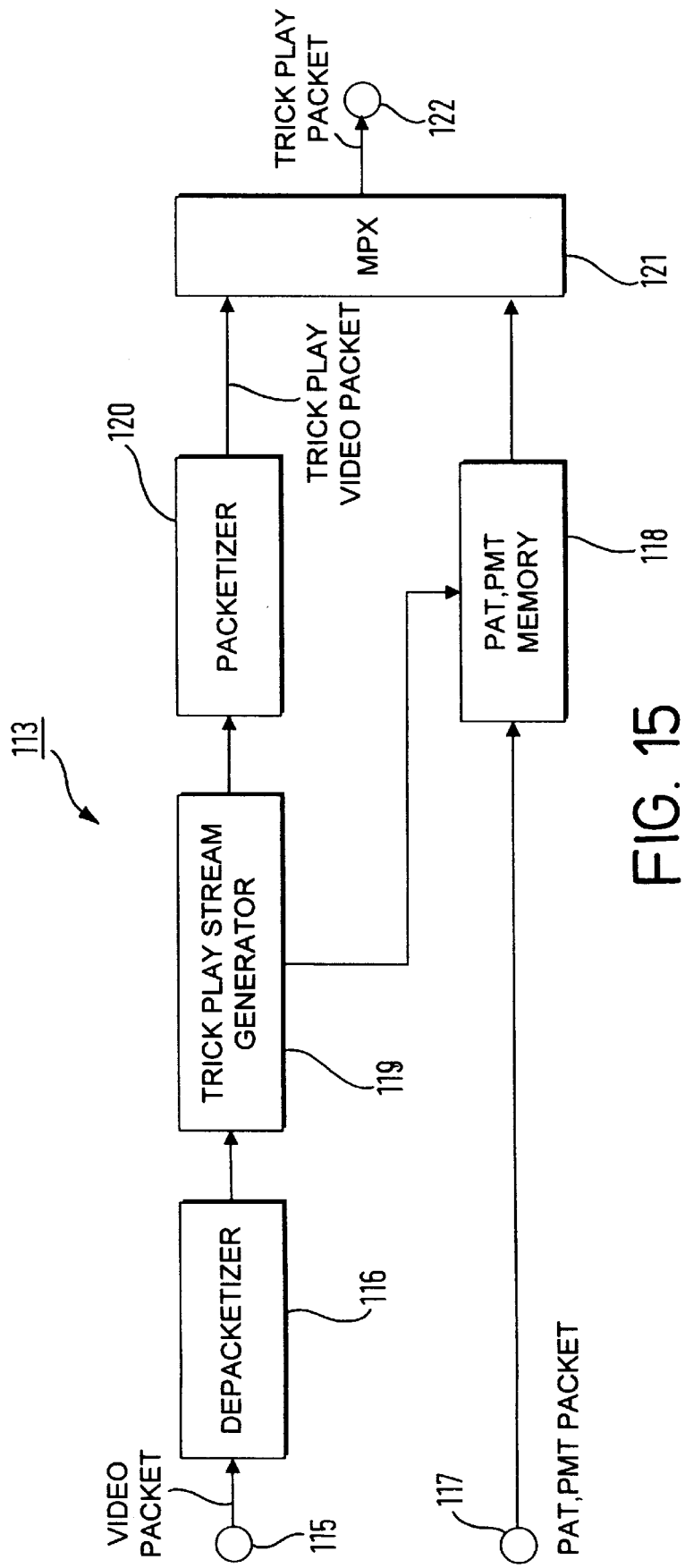
FIG. 15 is a block diagram explaining the construction of a trick play packet generator 13 shown in FIG. 14.

FIG. 15 is a block diagram illustrating the construction of the trick play packet generator 113 shown in FIG. 14.

Video packets are supplied to a depacketizer 116 through a terminal 115, and PAT and PMT packets are supplied to a PAT/PMT memory 118 through a terminal 117. The depacketizer 116 restores the condition of the coded video data stream before packetization by depacketizing the video packets and outputs the coded video data stream to a trick play stream generator 119. The trick play stream generator 119 generates a trick play data stream by extracting a part of, for instance, the input video data stream. For example, the trick play stream generator 119 may extract intra-frame compression data and various header information as a trick play data stream. Further, the trick play stream generator 119 may extract DC components of a coefficient of a DCT transform and various header information as a trick play data stream. The trick play stream generator 119 also may use inter-frame compression data as a trick play data stream. The trick play stream generator 119 outputs the generated trick play data stream to a packetizer 120. The packetizer 120 then produces trick play video packets by packetizing the input trick play data stream and provides the data stream to an MPX 120.

The trick play stream generator 119 supplies information at the top of the trick play frame when generating the trick play data stream to the PAT/PMT memory 118. The PAT/PMT memory 118 records the PAT and PMT packets which are input through the terminal 117 and outputs the stored PAT and PMT packets to the MPX 121 at the timing based on the information in the top position. The MPX 121 multiplexes the PAT and PMT packets from the PAT/PMT memory 118 with trick play video packets from the packetizer 120 and outputs the packets to the MPX 111 through the output terminal 122.

Packet data which are input through the terminal 110 are also supplied to the MPX 111. The MPX 111 has a buffer (not shown) for retaining the trick play packets from the trick play packet generator 113 and the input packets, and the MPX 111 outputs trick play data packets at a timing corresponding to the trick play data recording areas of a magnetic tape and also outputs the input data packets as normal reproduced packets at another timing. Further, the output of the MPX 111 is recorded on a recording medium after the recording format process, the error correction code adding process and the modulation process are applied.

Figure 16:
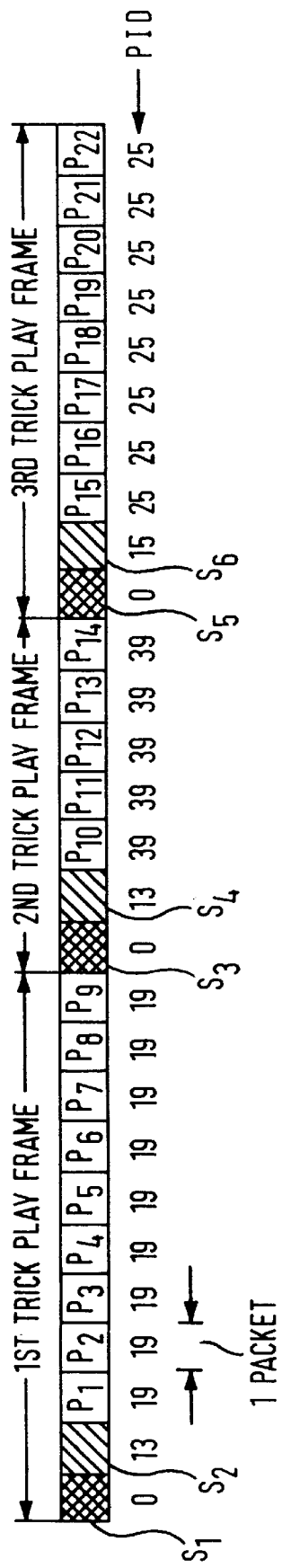
FIG. 16 is a diagram illustrating the operation of the embodiment.

Next, operation of the embodiment as described above will be described with reference to FIG. 16. FIG. 16 is a diagram illustrating the output of the MPX 121. In FIG. 16, the checkered portion indicates the PAT packet and the shaded portion indicates the PMT packet.

Packet data which are input through the input terminal 110 are supplied to the DMPX 112, which in turn detects a PID of the data packet. If, for instance, a transport data packet of the MPEG2 standard is supplied to the DMPX 112 as a data packet, the DMPX 112 detects a PID of a PMT packet from a PAT packet having the 0th PID and identifies the types of the data packets from the PMT packet identification table. The DMPX 112 then sorts the packets into video packets, audio packets, PAT and PMT packets and other packets and outputs the video packets and PAT and PMT packets to the trick play packet generator 113.

Now, it is assumed that the PAT packet indicates that the PID of the PMT packet is 13 and the PMT packet indicates that the PID of video packet is 19. In FIG. 15, a video packet with PID 19 is supplied to the depacketizer 116 of the trick play packet generator 113 for depacketizing. The depacketizer 116 restores the input video packet to an original video coded bit stream and supplies the bit stream to the trick play stream generator 119.

The trick play stream generator 119 generates a trick play data stream using, for instance, intra-frame compression data out of the input bit stream. In this case, the trick play stream generator 119 outputs the information at the top of the trick play frame whenever outputting a trick play data stream based on a different trick play frame. The generated trick play data stream is packetized again in the packetizer 120. The trick play video packet from the packetizer 120 is supplied to the MPX 121.

On the other hand, PAT and PMT packets are supplied to the PAT/PMT memory 118 through the terminal 117. The PAT/PMT memory 118 stores the PAT and PMT packets and outputs the stored PAT and PMT packets at a timing based on the top position information. The PAT and PMT packets from the PAT/PMT memory 118 are supplied to the MPX 121.

Now, it is assumed that nine trick play video packets are generated according to the trick play data stream based on a first trick play frame. The MPX 121 outputs these nine trick play video packets by adding the PAT and PMT packets to the top of the first frame as shown in FIG. 16. Further, with respect to the first trick play frame in FIG. 16, the PIDs of the PAT packet, the PMT packet and the trick play video packet are assigned to the 0th, 13th and 19th positions, respectively.

Next, it is assumed that five trick play video packets are generated by the trick play data stream according to a second trick play frame. Further, with respect to the original second frame of the second trick play frame, the PID of the PMT packet is assigned to the 13th position and the PID of the video packet is assigned to the 39th position. The PAT and PMT packets input through the terminal 117 are supplied to the MPX 121 via the PAT/PMT memory 118. Thus, the MPX 121 outputs five trick play video packets of the second trick play frame by adding the PAT and PMT packets to the top of these video packets.

Then, it is assumed that eight trick play video packets are generated by the trick play data stream according to a third trick play frame. Further, with respect to the original third frame of the third trick play frame, the PID of the PMT packet is assigned to the 15th position and the PID of the video packet is assigned to the 25th position. The PAT and PMT packets input through the terminal 117 are supplied to the MPX 121 via the PAT/PMT memory 118. Thus, the MPX 121 outputs eight trick play video packets of the third trick play frame by adding the PAT and PMT packets to the top of these video packets.

The trick play packets from the MPX 121 are supplied to the MPX 111 through terminal 122. These trick play packets are retained in a buffer in the MPX 111. On the other hand, the data packets input through the input terminal 110 are also supplied to the MPX 111 for storing in the buffer (not shown). The MPX 111 outputs trick play packets during the period corresponding to the trick play data recording areas of a magnetic tape and outputs the data packets supplied from the input terminal 110 during the period corresponding to areas other than the trick play data recording areas. The output of the MPX 111 is supplied to a recording section (not shown) as recording data, and the recording data is recorded on a magnetic tape after a prescribed header and an error correcting code are added and a prescribed modulation process is applied.

Since the trick play packets are generated with PAT and PMT packets inserted in the trick play frames in this embodiment, it is possible to detect a reproduced packet at the boundary between the trick play frames and rearrange the packets in trick play frames without having to insert a flag indicating the frame boundary in the packets or sync-blocks. Therefore, it is possible to decode and reproduce a series of reverse trick play frames easily.

Further, the packetizer 120 uses the same PID as the data packets input through the terminal and as the PID of trick play packets in this embodiment. However, a PID different from the PID of the input data packets may be set up by changing data of the PAT/PMT memory 118.

Figure 17:
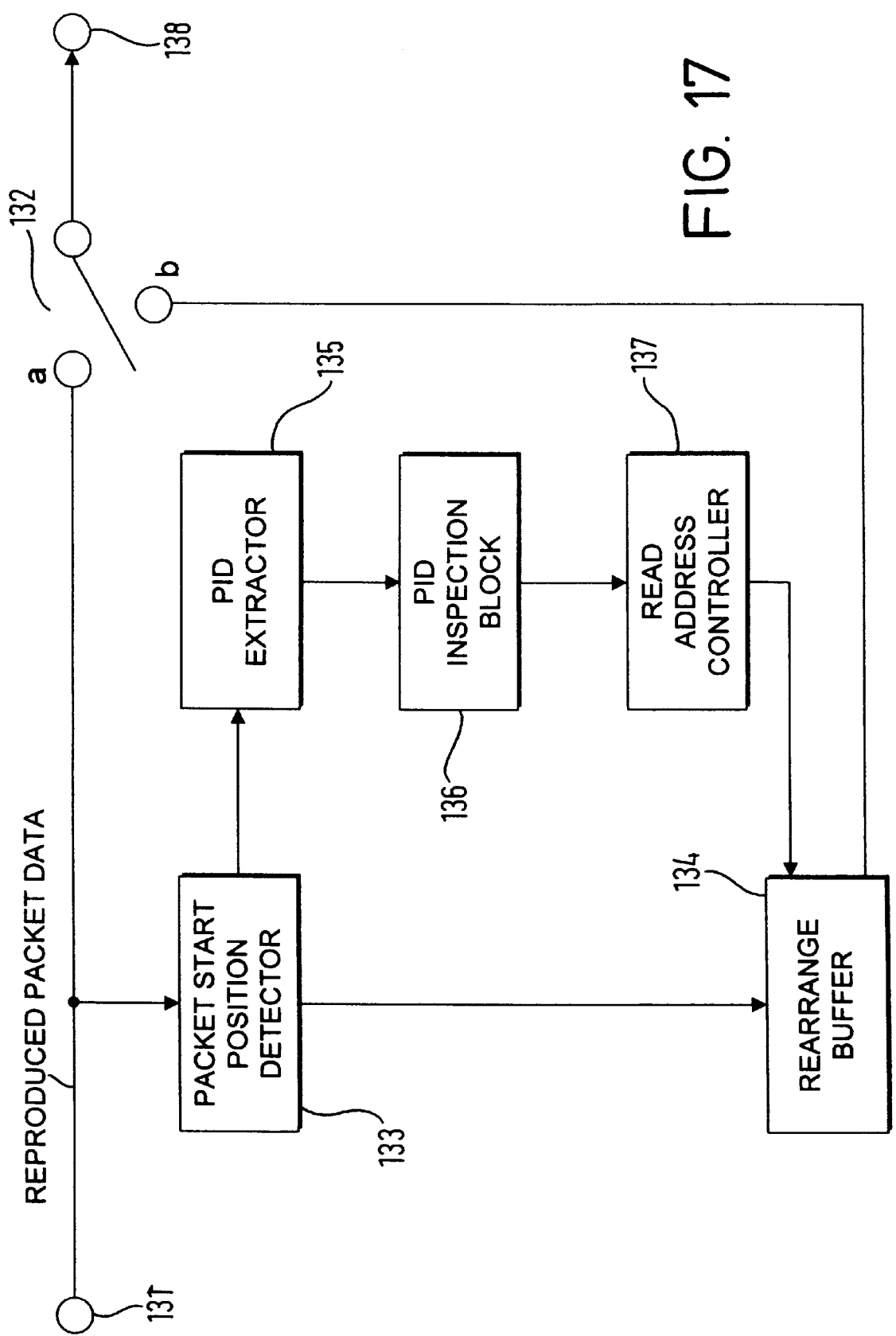
FIG. 17 is a block diagram showing an embodiment of a data packet reproducing apparatus according to the second aspect of the present invention.

FIG. 17 is a block diagram showing an embodiment of a data packet reproducing apparatus according to the second aspect of the present invention. This embodiment is for restoring an image by playing back a magnetic tape recorded using the data packet recording apparatus of the embodiment shown in FIG. 14.

Reproduced packet data are supplied to an input terminal. This reproduced packet data are obtained by demodulating data reproduced from a recording medium after an error correction process and a record unformat process are applied. The reproduced packet data are supplied to terminal a of a switch 132 and a packet start position detector 133.

The packet start position detector 133 detects the top of the packet of reproduced packet data using, for instance, the sync byte. As described above, the sync byte is periodically transmitted every 188 bytes if a packet length is 188 bytes and therefore, the top of the packet can be detected by the sync byte. Further, since the sync byte is a specific code, some recording apparatus may remove the sync byte. Even in this case, however, the top of the packet can be obtained if information conforming to the sync position, which is obtained when data packets are reproduced and errors are corrected, is input. The packet start position detector 133 outputs the information in the top of the packet together with a reproduced data packet to a PID extractor 135 and a rearrange buffer 134.

The PID extractor 135 detects the position of the data packet based on the information on the top of the packet and sequentially extracts PIDs from a series of data packets and outputs the PIDs to a PID inspection block 136. The PID is transmitted in a 13 bit length starting from the fourth bit away from the sync byte as shown in FIG. 1, and the PID extractor 135 extracts these 13 bits. Further, if no sync byte is recorded, the same result can be obtained if a sync byte is recorded while outputting data packets from the output terminal 138. Further, even when data packets have been recorded with information in addition to the sync byte removed, it is possible to get the PID position if the sync position information indicating a boundary between data packets is input.

The PID inspection block 136 inspects whether the extracted PID is a specific PID showing the top of the trick play frame and outputs the inspection result to a read address controller 137. The read address controller 137 generates a read address of the rearranging buffer 134 based on the inspection result and supplies the read address to the rearranging buffer 134.

The rearranging buffer 134 stores the reproduced packet data from the packet start position detector 133 in the order of input, reads the read address stored based on the read address from the read address controller 137, and outputs the reproduced packet data to terminal b of the switch 132. The switch 132 selects terminal a for normal speed playback and trick play in the forward direction and outputs the reproduced packet data from the input terminal 131 directly from the output terminal 138. The switch 132 selects terminal b for reverse trick play and outputs the data packet from the rearranging buffer 134 from the output terminal 138.

The operation of this embodiment in the construction as described above will be explained now.

Here, it is assumed that four trick play packets can be recorded in one trick play data recording area of a magnetic tape (not shown). That is, 28 data packets of the 1st through the 3rd trick play frames in FIG. 16 can be recorded in seven trick play data recording areas T1 through T7. The packet S1, PMT packet S2, and trick play video packets P1, P2 of the 1st trick play frame are recorded in trick play data recording area T1, and trick play video packets P3 through P6 are recorded in trick play data recording area T2. Similarly, in trick play data recording areas T3 through T7, packets P7 through P9, S3; packets S4; P10 through P12, packets P13, P14, S5, S6 packets P15 through P18; and packets P19 through P22 are recorded, respectively.

Therefore, during the reverse trick play, reproduced data are obtained in order of the packets P19, P20, P21, P22; the packets P15, P16, P17, P18; packets P13, P14, S5, S6; packets S4, P10, P11, P12; packets P7, P8, P9, S3; packets P3, P4, P5, P6; and packets S1, S2, P1 and P2.

A series of the reproduced packet data are supplied in order to the rearranging buffer 134 through the packet start position detector 133 for storage. The packet start position detector 133 detects the top position of each reproduced packet. The PID extractor 135 extracts the PID of every packet based on the information of the top position of the packet and outputs the PID to the PID inspection block 136. The PID inspection block 136 inspects whether the PID is assigned to the 0th position and supplies the inspection result to the read address controller 137.

For instance, if the reproduced packet data S5 is input to the rearranging buffer 134, the PID inspection block 136 inspects the data to confirm that the PID is 0 and outputs the inspection result. Then, after storing the packets up to a packet next to the reproduced packet data S5 in the rearranging buffer 134, the read address controller 137 generates read addresses to output the stored data in reverse order in every four packets. That is, the rearranging buffer 134 first outputs the data packet S5 and S6 recorded in the trick play data record area T5 and then outputs data packets P15 through P18 recorded in the trick play data recording area T6 and then outputs the data packet P19 through P22 recorded in the trick play data recording area T7. Next, the data packets P15 through P22, which are required for decoding the third trick play frame, can be output to the switch 132.

The reproduced packet data S4, P10, P11 and P12 are input to the rearranging buffer 134 and then the reproduced packet data P7, P8, P9 and S3 are input in order. When the reproduced packet data S3 is input, the PID inspection block 136 outputs the inspection result showing that a PID is a specific PID. Then, the read address controller 137 outputs addresses to the rearranging buffer 134 and outputs the stored reproduced packet data S3, S4 and P10 through P14 in order. Thus, the data packets P10 through P14, which are required for decoding the second trick play frame, can be output to the switch 132.

Similarly, it is also possible to output the data packets P1 through P9, which are required for decoding the first trick play frame, to the switch 132.

In the reverse trick play mode, the switch 132 selects terminal b and outputs the sequentially input data packets in the reverse order of the frames to the output terminal 138. It is possible to display trick play images in the reverse order of the frames by decoding the data packets from the output terminal 138 in order. Further, in normal speed playback mode and trick play in the forward direction, the switch 132 selects terminal a and directly outputs the input reproduced packet data.

As described above, in this embodiment the top of the trick play frame is detected by inspecting whether a PID is a specific one, and a read address of the rearranging buffer 134 is generated. The data packet of each frame can be sequentially output in the reverse order of the frames. Thus, it becomes possible to restore a reverse trick play image without inserting a flag in any packets or sync blocks.

FIG. 18 is a diagram illustrating another embodiment according to the second aspect of the present invention.

In the embodiment shown in FIG. 14, each trick play packet is recorded one at a time on a recording medium. However, when, for instance, the recorded data are reproduced in the reverse direction at 8 times speed, the trick play data recording areas are traced at intervals of eight tracks. Therefore, if each trick play packet is recorded one at a time in every trick play data recording area, it is required to bring the tracking phases in agreement with each other at eight track intervals. Similarly, for instance, when the recorded data are reproduced in the reverse direction at 16 times speed, it is required to bring the tracking phases in agreement with each other at 16 track intervals.

However, a pilot system which is capable of on-tracking at a cycle of four tracks has been adopted in consumer-use digital VTRs, etc. So, in this embodiment the same trick play packet is recorded a multiple number of times so that the trick play packet can be reproduced at any timing allowed in the on-tracking. FIG. 18 shows an example where every trick play packet is recorded two times, which is provided for reverse direction reproduction at 8 times speed. The shaded portions in FIG. 18 show the trick play data recording areas. The solid lines in FIG. 18 show the actual traces K1, K2, etc., and the broken lines show available traces K1', K2', etc.

Thus, in either tracking phase, whether traces K1, K2, etc., are obtained or whether the traces K1' and K2' are obtained, trick play data can be reproduced accurately when the same trick play data are recorded in two trick play data recording areas which are adjacent to each other at intervals of four tracks.

In this embodiment, the apparatus can be constructed with circuits which are nearly the same as those in the embodiment shown in FIG. 14 with a buffer added, and the apparatus retains and repeatedly outputs the output of the trick play packet generator 113 in FIG. 14 so that the MPX 111 outputs the same trick play packet at a timing corresponding to multiple trick play data recording areas at intervals of four tracks.

Other operations and effects are the same as those of the embodiment shown in FIG. 14.

The present invention is not limited to the embodiments described above. For instance, 0 has been selected for a specific PID in the embodiments, but packets having other PIDs may be added in trick play frames. Further, the boundary between the trick play images is detected at the time of reproduction by arranging a packet having a specific PID immediately before the trick play images in the embodiments described above, but the packets may be recorded by adding the packet having a specific PID at the end of every trick play image instead. Further, the packets may be recorded by arranging the packet having a prescribed PID at a specific position. For instance, if the packet having a specific PID is added at the position three packets before the data packet train, the packets may be rearranged from the packet which is three packets behind from the packet detected to have a specific PID in the trick play. Thus, when data packets are recorded with a packet having a specific PID arranged at a prescribed position of a packet train for a trick play image, and by detecting the specific PID in the trick play, it is possible to rearrange data packet in trick play images.

As described above, the second aspect of the present invention has such an effect that data can be restored without recording information in the packets or sync blocks indicating a packet at the boundary between frames when a packet having a specific packet ID is recorded in the prescribed number of packets provided for trick play frames.

As described above, the present invention can provide an extremely preferable data packet recording apparatus and reproducing apparatus therefor.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A packet data apparatus comprising:

trick play packet generating means for generating trick play packets by extracting one or plural types of prescribed data packets from an input data packet train comprising plural types of time-division multiplexed data in a prescribed number of packets based on an identification signal inserted for every packet and outputting a trick play data packet train having a plurality of trick play frames, each trick play frame containing a plurality of trick play packets, by packetizing the generated trick play data;

identification table packet inserting means for separating and retaining an identification table packet contained in the input data packet train for discriminating the identification signal and outputting only the same identification table packet repeatedly into said trick play data packet train; and recording means which is capable of recording the output of the identification table packet inserting means in trick play data recording areas at specified trick positions.

2. A packet data recording apparatus as claimed in claim 1, wherein the identification table packet inserting means inserts an identification table packet into the trick play data packet train in data constructing a trick play image.

3. A packet data recording apparatus as claimed in claim 1, wherein the trick play packet generating means sets up an identification signal which is different from the identification signal contained in the input data packet train as an identification signal for the trick play date packet train.

4. A packet data recording apparatus as claimed in claim 3, wherein the trick play packet generating means assigns a prescribed code which is not set up for the input data packet train as an identification signal for the trick play data packet train.

5. The packet data apparatus of claim 1, wherein the identification table packet inserting means inserts the identification table into each trick play frame.

6. The packet data apparatus of claim 1, wherein the recording means records the output of the identification table packet inserting means such that each trick play recording area contains at least one identification table packet.

7. A packet data apparatus comprising:
trick play packet generating means for generating trick play packets by selecting one or plural types of prescribed data packets from an input data packet train comprising plural types of time-division multiplexed data in a prescribed number of packets based on an identification signal inserted for every packet and outputting a trick play data packet train having a plurality of trick play frames, each trick play frame containing a plurality of trick play packets, by packetizing the generated trick play data;
identification table packet inserting means for separating and retaining an identification table packet contained in the input data packet train for discriminating the identification signal and outputting only the same identification table packet repeatedly into said trick play data packet train; and
recording means which is capable of recording the output of the identification table packet inserting means in trick play data recording areas at specified track positions.

8. The packet data apparatus of claim 7, wherein the identification table packet inserting means inserts the identification table into each trick play frame.

9. The packet data apparatus of claim 7, wherein the recording means records the output of the identification table packet inserting means such that each trick play recording area contains at least one identification table packet.

10. A reproducing apparatus comprising:
reproducing means for reproducing data recorded by a recording means having trick play packet generating means for generating trick play packets by selecting one or plural types of prescribed data packets from an input data packet train comprising plural types of time-division multiplexed data in a prescribed number of packets based on an identification signal inserted for every packet and outputting a trick play data packet train having each frame containing a plurality of trick play packets, by packetizing the generated trick play data; identification table packet inserting means for separating and retaining an identification table packet contained in the input data packet train for discriminating the identification signal and outputting only the same identification table packet repeatedly into said trick play data packet train; and recording means which is capable of recording the output of the identification table packet inserting means in trick play data recording areas at specified track positions, the reproducing apparatus comprising:
trick play identification table generating means for generating an identification table packet responding to the identification table packets in the trick play recording areas; and
mixing means for mixing the output of the reproducing means with the output of the trick play identification table generating means.

11. A data packet recording apparatus comprising:
trick play packet generating means for constructing trick play data packets by extracting desired packets from an input data packet train containing different types of packets which are time-division multiplexed in a prescribed number of packets for each trick play frame and packetizing the generated trick play data into trick play frames, said packets including a packet ID for identifying the different types of packets, wherein the packet ID is a PID of a transport stream data packet as defined by an MPEG standard;
specific packet inserting means for inserting a packet having a specific packet ID in the prescribed number of packets provided for each trick play frame output from the trick play data packet generating means, said specific packet inserting means having a position detecting means for detecting the boundary between trick play frames and a multiplexing means for arranging a packet having a specific packet ID at a prescribed boundary position detected by the position detection means; and
recording means for recording the trick play packets in trick play data recording areas at prescribed positions of tracks formed on a magnetic tape.

12. A data packet recording apparatus as claimed in claim 11, wherein the multiplexing means is comprised of a storage means for storing the packet having the specific packet ID separated from the input data packet train; and
reading means for reading packets stored in the storage means according to the boundary position detected by the position detecting means.

13. A data packet recording apparatus as claimed in claim 11, wherein the multiplexing means arranges a packet having a specific packet ID immediately before or immediately after the prescribed number of packets provided for the trick play frames.

14. A data packet recording apparatus as claimed in claim 11, wherein the recording means records the same trick play packets in the number of trick play data recording areas responding to multiple playback speeds.

15. A data packet recording apparatus as claimed in claim 11, wherein the packet having the specific packet ID is a transport data packet at the 0th PID in the MPEG standard.

16. A data packet reproducing apparatus for playing back a magnetic tape recorded by a data packet recording apparatus having trick play packet generating means for constructing trick play data packets by extracting desired packets from an input data packet train containing different types of packets which are time-division multiplexed in a prescribed number of packets for each trick play frame and packetizing the generated trick play data into trick play frames, said packets including a packet ID for identifying the different types of packets, wherein the packet ID is a PID of a transport stream data packet as defined by an MPEG standard; specific packet inserting means for inserting a packet having a specific packet ID in the prescribed number of packets provided for each trick play frame output from the trick play data packet generating means, said specific packet inserting means having a position detecting means for detecting the boundary between trick play frames and a multiplexing means for arranging a packet having a specific packet ID at a prescribed boundary position detected by the position detection means; and recording means for recording the trick play packets in trick play data recording areas at prescribed positions of tracks formed on a magnetic tape, the reproducing apparatus comprising:
specific packet detecting means for detecting the packets having the specific packet ID at the prescribed boundary position from the reproduced data obtained from playing back the magnetic tape; and rearranging means for rearranging the reproduced data in packets based on the detection of the specific packet ID at the prescribed boundary position by the specific packet detecting means in a fast reverse playback.

17. A data packet reproducing apparatus as claimed in claim 16, wherein the specific packet detecting means comprises:

top position detecting means for detecting the top of each packet from the reproduced data; and identification means for identifying a packet ID inserting position of each packet based on the top positioning detected by the top position detecting means and identifying whether each packet contains the specific packet ID.

18. A data packet reproducing apparatus as claimed in claim 17, wherein the top position detecting means detects the top of each packet based on a sync byte positioned at the top of the packet.

19. A data packet reproducing apparatus as claimed in claim 16, wherein the rearranging means has a storage means which stores reproduced date in packets, rearranges a series of the reverse trick play frames based on the detection by the specific packet detecting means and outputs a prescribed number of packets provided for the trick play frames to arrange them in the recorded order.

* * * * *